United States Patent
Aggarwal et al.

(10) Patent No.: US 12,475,150 B2
(45) Date of Patent: Nov. 18, 2025

(54) CONFIGURING A LARGE LANGUAGE MODEL TO CONVERT NATURAL LANGUAGE QUERIES TO STRUCTURED QUERIES

(71) Applicant: Microsoft Technology Licensing, LLC, Redmond, WA (US)

(72) Inventors: Vidit Aggarwal, Dublin, CA (US); Lukasz Janusz Karolewski, San Jose, CA (US); Ajay Prakash, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/590,114

(22) Filed: Feb. 28, 2024

(65) Prior Publication Data
US 2025/0272317 A1  Aug. 28, 2025

(51) Int. Cl.
*G06F 16/00* (2019.01)
*G06F 16/3329* (2025.01)

(52) U.S. Cl.
CPC ................... *G06F 16/3329* (2019.01)

(58) Field of Classification Search
CPC ...... G06F 40/00; G06F 40/40; G06F 16/2237; G06F 16/24522; G06F 16/252; G06F 16/316; G06F 16/332; G06F 16/3329; G06F 16/3347; G06F 16/338; G06F 16/355; G06F 16/367; G06F 16/90332; G06F 40/186; G06F 40/20; G06F 40/30; G06F 40/35; G06F 9/54; G01C 21/3484; G01C 21/3617; G10L 15/19; G10L 15/22; G10L 15/26; G06Q 40/123; H04M 1/6075; G06N 20/00; G06N 5/022
See application file for complete search history.

(56) References Cited

U.S. PATENT DOCUMENTS

| | | | |
|---|---|---|---|
| 11,954,102 B1 * | 4/2024 | Palaniappan | G06F 16/2237 |
| 2019/0011278 A1 * | 1/2019 | Vellasques | G01C 21/3484 |
| 2024/0346254 A1 * | 10/2024 | Liu | G06F 40/40 |
| 2024/0370479 A1 * | 11/2024 | Hudetz | G06F 16/316 |
| 2024/0411797 A1 * | 12/2024 | Blum | G06F 16/332 |
| 2025/0068488 A1 * | 2/2025 | Xu | G06F 40/40 |

* cited by examiner

*Primary Examiner* — Shyue Jiunn Hwa
(74) *Attorney, Agent, or Firm* — Nicholson De Vos Webster & Elliott LLP

(57) ABSTRACT

Embodiments of the disclosed technologies are capable of generating natural language queries. The embodiments describe generating a training natural language query of a training structured search query using a first LLM and a first prompt. The embodiments further describe fine-tuning a second LLM using the training natural language query of the training structured search query and the training structured search query. The fine-tuned second LLM generates a structured version of a natural language query. The embodiments further describe generating the structured version of a received natural language query using the fine-tuned second LLM and a second prompt.

19 Claims, 9 Drawing Sheets

CONFIGURING A LARGE LANGUAGE MODEL TO CONVERT NATURAL LANGUAGE QUERIES TO STRUCTURED QUERIES

TECHNICAL FIELD

Embodiments of the invention relate to the field of converting natural language queries to structured search queries.

BACKGROUND

A search engine is a software program that helps users retrieve information. A user provides search query terms through a search interface. When the user is finished providing the search query terms, the user inputs a signal that tells the search engine to initiate the search. In response to the initiate search signal, the search engine formulates a search based on the input search query terms, executes the search to retrieve information corresponding to the search query terms, and provides the retrieved information to the search interface.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
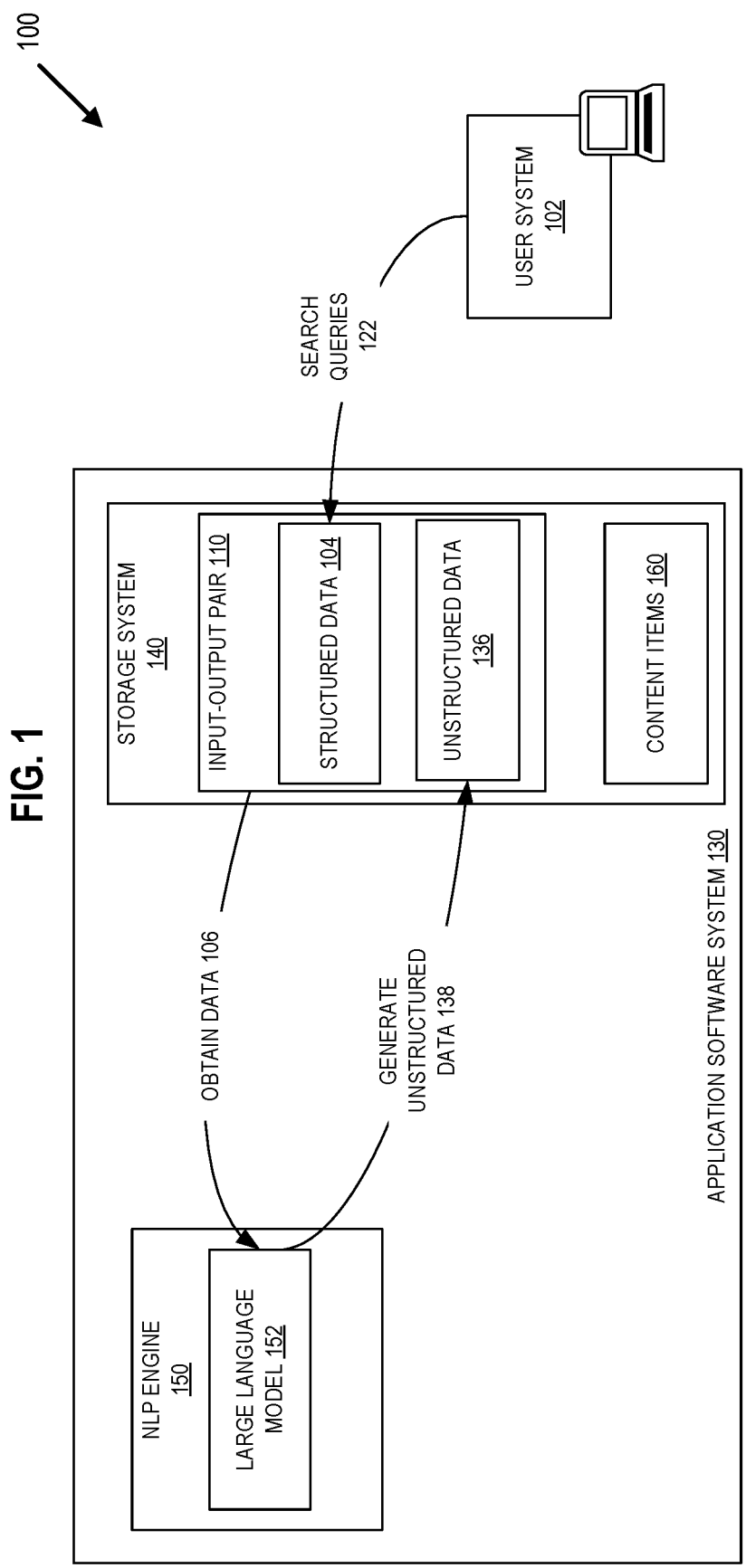
FIG. 1 is a flow diagram of an example method for generating input-output pairs, in accordance with some embodiments of the present disclosure.

Search systems commonly employ filters to facilitate information retrieval. Filters can be applied during query execution to limit the number of search results that are retrieved. For example, in a search for job candidates, filtering criteria such as geographic location and job title can reduce the size of a profile result set to profiles of only those candidates who reside in a particular geographic location or have a particular job title in their work history. Filters are associated with a filter type (e.g., geographic location, job title, etc.). Filter types are associated with filter values. For instance, a geographic location filter type can have thousands or more possible values corresponding to many different cities and towns across the globe.

Traditionally, filters are presented to the user as a set of selectable items such as check boxes, list items, or selectable button-shaped graphics. Typically, the filters are designed to be toggled. This allows users to turn filters on and off to see how the result set changes.

When filters are applied, typically, the filtered result set, including a set of digital content items that are related to the applied filters, is presented to the user instead of the unfiltered set, including a complete set of digital content items that may or may not be related to the applied filters. Thus, filters can help remove irrelevant or unwanted items from the complete result set. However, the liberal application of filters to search results can overly restrict the result set, such that relevant or desired items are not presented to the user, sometimes returning no results at all. On the other hand, conservatively applying filters to search results can cause the result set to be over inclusive such that many irrelevant items are presented to the user.

One technical problem related to using filters for information retrieval includes the optimal selection of filters to apply to the search results to obtain relevant or desired digital content items. As described above, applying too many filters or too few filters changes the information presented to the user. Users that spend time parsing through too many search results (responsive to the application of too few filters) waste computing resources associated with retrieving the extraneous irrelevant search results. Moreover, users that spend time parsing through the search results wastes resources such as bandwidth, power, and memory associated with storing the search results or otherwise reviewing the search results. On the other end, users that spend time executing multiple search queries (responsive to the application of too many filters) waste computing resources associated with the extraneous execution of search queries such as power, bandwidth, and memory associated with querying one or more databases or search engines for search results.

Another technical problem is that the categorical definitions or meanings of different filters may vary for different users. In a traditional filter selection process, the results displayed would be dependent upon the user's definitions of these terms because traditional database categorizations of these terms are inflexible. For example, the definition of the term "Fortune 500" is established at the time of system development to encompass a certain set of companies, but the set of companies associated with the term "Fortune 500" changes over time. As a result, predefined, static definitions (i.e., the original list of companies) can become outdated.

Another technical problem is that vocabulary evolves, making some filters obsolete or absent. For example, a phrase or term that was once common can change over time to become obsolete. Accordingly, any filter types and/or filter values associated with the phrase are obsolete, unnecessarily crowding a user interface and/or wasting memory in a system configured to store filter types and/or filter values. Additionally or alternatively, evolving language can introduce new phrases or terms. Accordingly, no such filter type and/or filter value exist, limiting the searches performed by users caused by the absence of such filter types and/or filter values.

Another technical problem is that the implementation of filter types and/or filter values causes limitations in user searches. For example, some conventional systems manually define filter types and/or filter values using a 1:1 mapping of a filter type to a search query term or a filter value to a search query term. The user selection of such filter types and/or filter queries causes information retrieval systems to obtain search results using the mapped search query term associated with the selected filter type and/or filter query.

The manually defined filter types and/or filter inherently limit the available filter types and/or filter values that a user can select, thereby limiting user searches. Additionally, the manually defined filter types and/or filter values introduce lag, which also limits the available filter types and/or filter values that a user can select, thereby limiting user searches. For example, administrators must manually add new filter types and/or filter types associated with new phrases or new language.

Further, the manually mapped filter types and/or filter values are subjective with respect to the user mapping the filter type and/or filter value to the search query term. For example, a user searches using the predetermined filter types and/or filter values using their own subjective understanding of the filter types and/or filter values, which may be different from the subjective understanding of the administrator who mapped the filter types and/or filter values to search query terms. For instance, some users may assume that the filter type West Coast includes the filter value Colorado, whereas other users may believe that the filter type West Coast does not include the filter value Colorado. Additionally, some filter types and/or filter values are not necessarily mutually exclusive. For example, the filter value Colorado can be associated with the filter type West Coast and also the filter type North America. The subjective interpretation of filter types and/or filter values can cause different users to select different filter values and/or filter types. As a result, when users are required to explicitly select filters, search consistency and therefore search efficiency between different users for the same search query can be variable, causing poor user experience and unnecessary computing resource demands. In other words, users are limited in their selection of predetermined filter types and/or filter values instead of being able to freely enter their own search query terms, thereby limiting user searches.

Requiring the user to select each and every filter type and/or filter value that they want included in a result set is tedious and time consuming for the user, as well as a potential source of error. Additionally, presenting all of these filter types and filter values to the user may not be practical given the technical specifications of the user's computing device. For example, if the user's device has a small form factor, like a smart phone or wearable device, it may be impossible to fit all of the filter types and filter values on the user's display screen and impractical to require the user to scroll through multiple pages of filters. To address these and other technical challenges, embodiments of the disclosed technologies provide a natural language processing (NLP) engine that uses a large language model to identify filter types and/or filter values to be included in a search query based on the user's natural language input, without requiring the user to explicitly select those filters. The NLP engine described herein leverages natural language understanding to convert a natural language unstructured input into a structured version of the natural language unstructured input.

In a non-limiting example, if the user searches a natural language query such as "companies on the west coast," embodiments automatically determine the names of companies located in Washington, Oregon, and California and filter the search results without requiring the user to explicitly select those company names as query terms.

The methods and processes of the present disclosure can apply a natural language interface to legacy information retrieval systems. For example, conventional (or legacy) methods of information retrieval can use entity tags to map search results to corresponding filter types and/or filter values. The methods and processes described herein improve conventional search systems by shifting the burden of query formation from the user (e.g., selecting the appropriate filters to obtain relevant tagged search results) to the NLP engine described herein. The NLP engine described herein is used to generate a training dataset including diverse variations of natural language queries and associated structured data representations. To generate the training dataset, language models of the NLP engine perform a text generation task. Language models of the NLP engine are then trained to convert a natural language search query into a structured version of the natural language search query using the generated training dataset. Converting the natural language search query into the structured version of the natural language search query includes mapping the text of the natural language search query to filter types and/or filter values using multi-class classification tasks. Leveraging the NLP engine in information retrieval systems improves the user experience by uncluttering the user interface. For example, conventional user interfaces including multiple buttons or other check boxes corresponding to filter types and/or filter values, can be simplified to a natural language interface including a text box for receiving natural language text.

Instead of the conventional approach, embodiments of the disclosed technologies can interpret the user's input, "East Coast," into cities, states or other regions that are in located on the East Coast of the United States of America and automatically modify the query to include those locations. This enables any information retrieval system to return relevant results without requiring the user to know of the relevant filter types and/or filter values (e.g., the names of the cities or states that are in the East Coast). The disclosed technologies project language phrases into a space used to identify filter types and/or filter values, thereby shifting, the burden of searching from the user (e.g., removing the requirement that the user needs to know the states located on the East Coast of the United States of America) to the NLP engine described herein.

A generative model uses artificial intelligence technology, e.g., neural networks, to machine-generate new digital content based on model inputs and the previously existing data with which the model has been trained. Whereas discriminative models are based on conditional probabilities $P(y|x)$, that is, the probability of an output y given an input x (e.g., is this a photo of a dog?), generative models capture joint probabilities $P(x, y)$, that is, the likelihood of x and y occurring together (e.g., given this photo of a dog and an unknown person, what is the likelihood that the person is the dog's owner, Sam?).

A generative language model is a particular type of generative model that generates new text in response to model input. The model input includes a task description, also referred to as a prompt. A prompt can be in the form of natural language text, such as a question or a statement, and can include non-text forms of content, such as digital imagery and/or digital audio. The prompt can include instructions and/or examples of content used to explain the task that the generative model is to perform. Modifying the instructions, examples, content, and/or structure of the prompt causes modifications to the output of the model. For example, changing the instructions included in the prompt causes changes to the generated content determined by the model.

Prompt engineering is a technique used to optimize the structure and/or content of the prompt input to the generative model. Some prompts can include examples of outputs to be generated by the generative model (e.g., few-shot prompts), while other prompts can include no examples of outputs to be generated by the generative model (e.g., zero-shot prompts). Chain of thought prompting is a prompt engineering technique where the prompt includes a request that the model explain reasoning in the output. For example, the generative model performs the task provided in the prompt using intermediate steps where the generative model explains the reasoning as to why it is performing each step.

A large language model (LLM) is a type of generative language model that is trained using an abundance of data (e.g., publicly available data) such that billions of hyperparameters that define the LLM are used to iteratively develop statistical correlations that enable the performance of a task. Some pretrained LLMs, such as generative pretrained transformers (GPT) can be trained to perform tasks including natural language processing (NLP) tasks such as text extraction, text translation (e.g., from one language to another), text summarization, and text classification.

LLMs are trained to perform tasks by relying on patterns and inferences learned from training data, without requiring explicit instructions to perform the tasks. Supervised learning is a method of training a machine learning model, such as an LLM, given input-output pairs. An input-output pair is an input with an associated known output (e.g., an expected output, a labeled output, a ground truth).

During a training period, a machine learning model iteratively develops statistical correlations used to perform a task, such as an NLP task, by receiving training samples included as a training input. The machine learning model then predicts an output, by identifying one or more values with the highest confidence scores or probabilities, related to the task to be learned and compares the predicted output to the known output associated with the training input (e.g., the output of the input-output pair). Over time, (e.g., a number of training iterations), an error based on the difference between the predicted output and the known output decreases. To train the machine learning model to perform the target task, large amounts of training samples (including training inputs and associated known outputs) are used to train the machine learning model. Collecting such training samples can be time consuming, costly, and error prone. For example, in some conventional approaches, hundreds of thousands of training samples (e.g., input-output pairs) are used to train the machine learning model.

Implementations of the described approaches generate training data using an LLM. The generated training data includes natural language queries associated with a structured data representation of a search query (e.g., a structured search query). Each of the generated natural language queries can represent a keyword, sentence, partial sentence or other natural language query that would result in the structured data representation of the search query. Accordingly, the LLM generates a diverse set of natural language queries associated with a single structured search query.

Implementations of the described approaches can use the generated training data. For example, examples of natural language queries associated with a single structured search query can be provided as few-shot examples to a second LLM using retrieval augmented generation (RAG). The second LLM generates a structured version of a natural language query using the few-shot examples. Additionally or alternatively, the generated training data can fine-tune a second LLM. The fine-tuned LLM is encoded with filter type and/or filter values such that the fine-tuned LLM can map natural language text to filter types and/or filter values, thereby generating a structured data version of the natural language query.

The disclosed technologies are described in the context of a search system of an online network-based application software system. For example, news and entertainment apps installed on mobile devices and messaging systems can function as application software systems that include search systems. An example of a search use case is a user of an online system searching for jobs or job candidates over a professional social network that includes information about companies, job postings, and users of the online system. The above-described terminology is used only for ease of discussion and not to limit the scope of the claims.

Aspects of the disclosed technologies are not limited to filter-based queries (e.g., queries that depend on identifying search results using filter types and/or filter values) but can be used to improve search systems more generally. For example, other structured queries such as structured query language (SQL) can be mapped to natural language queries using the NLP engine described herein. Accordingly, natural language queries can be mapped back to SQL queries. The disclosed technologies can be employed by many different types of network-based applications in which a search interface is provided, including but not limited to various types and forms of application software systems.

The disclosure will be understood more fully from the detailed description given below, which references the accompanying drawings. The detailed description of the drawings is for explanation and understanding and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains but can be used with or incorporated into other embodiments, including embodiments shown in other drawings.

FIG. 1 is a flow diagram of an example method for generating input-output pairs, in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a NLP engine 750 of FIG. 7, including, in some embodiments, components shown in FIG. 7 that may not be specifically shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 1, computing system 100 includes a user system 102 and an application software system 130. The application software system 130 includes a storage system 140, which stores data such as input-output pairs (e.g., structured data 104 and unstructured data 136), and content items 160. The application software system 130 also includes a natural language processing engine (NLP engine 150), which includes a large language model (LLM) 152. In the example of FIG. 1, the components of the NLP engine 150 are implemented using an application server or server cluster, which can include a secure environment (e.g., secure enclave, encryption system, etc.) for the processing of search query data.

As indicated in FIG. 1, components of computing system 100 are distributed across multiple different computing devices, e.g., one or more client devices, application servers, web servers, and/or database servers, connected via a network, in some implementations. In other implementations, at least some of the components of computing system 100 are implemented on a single computing device such as a client device. For example, some or all of the NLP engine 150 is implemented directly on the user's client device in some implementations, thereby avoiding the need to communicate with servers over a network such as the Internet.

User system 102 includes at least one computing device, such as a personal computing device, a server, a mobile computing device, or a smart appliance. User system 102 includes at least one software application, enabling the user system 102 to bidirectionally communicate with the application software system 130. Additionally, the user system 102 can include a user interface that allows a user to enter a search query by selecting one or more predetermined filter types and/or filter values (e.g., using check boxes, list items, or selectable button-shaped graphics). In some embodiments, the user system 102 can include a user interface that allows the user to enter a search query by entering a natural language query into a text box, for instance. The search results can be displayed to a user using the user system 102 via the user interface.

Application software system 130 is any type of application software system that provides or enables at least one form of digital content distribution of content items 160 to user systems such as user system 102. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

A user using user system 102 may execute a search for content items 160 using an information retrieval system (not shown) including a selection of one or more filters from a set of predetermined filters. The content items 160 include any digital content provided by the application software system 130 that can be displayed using to the user using the user system 102. For example, content items 160 can include digital content such as articles, job posting, blogs, user profiles, etc.

Training data (e.g., input-output pairs 110) is collected via interactions of user system 102 with a search engine. For example, a user using user system 102 can enter search query 122 by selecting one or more filter types and/or filter values. The search query 122 is used to retrieve specific digital content items of the set of content items 160. Applying filters to a search query constrains the set of search results. The search query 122 is stored in the storage system 140 as the structured data 104 portion of the input-output pair 110. Structured data 104 is constrained data where one or more of the values and/or the format of the data is constrained. The selection of the filter types and/or filter values of the search query 122 is in a predetermined format and inherently constrains the search criteria. For example, the structured data 104 can be a JavaScript Object Notation (JSON) data structure and the set of predetermined filters are predetermined objects in the JSON format. When a user applies a filter to a search query, the corresponding object in the JSON data is set, thereby acting as a constraint to the set of search results. While a JSON format of structured data 104 is described, other data structures can be used to store and apply constraints on the set of search results (such as HTML formats).

In some embodiments, structured data 104 can include stored search queries 122 entered by a user via user system 102. In some embodiments, search queries 122 and the corresponding structured data 104 are stored in the storage system 140 responsive to one or more conditions. For example, structured data 104 is stored in the storage system 140 responsive to search queries 122 associated with particular user systems 102, search queries 122 that have been searched by a user system 102 within a predefined time (e.g., the last 3 months), successful search queries 122 (e.g., search queries that resulted in a user using the user system 102 selecting a search result), saved search queries 122 (e.g., search queries that resulted in a user using the user system 102 to save one or more search results determined using the search query 122), search queries 122 associated with a particular entity (e.g., a person, a company), search queries 122 associated with entities that share a set of common attributes (e.g., people with the same job title, companies that are the same size, people that live in the same geographic region, etc.). In some embodiments, structured data 104 is generated by one or more administrators (not shown).

The NLP engine 150 obtains data 106 (e.g., the stored structured data 104) to generate natural language queries associated with the structured data 104 using large language model (LLM) 152. In some embodiments, (not shown) the user system 102 enters one or more natural language queries associated with the entered search query 122. The natural language queries are unstructured versions of the search query 122. The natural language queries can be stored in unstructured data. Unstructured data 136 is data that is not in a predetermined format or style such as free-form text (e.g., one or more words, phrases, or sentences). In some embodiments, when the NLP engine 150 obtains data 106, the NLP engine 150 obtains user-generated input-output pairs (e.g., the user generated structured data 104 and the corresponding user generated unstructured data 136).

Using the structured data 104, the LLM 152 generates one or more natural language queries (e.g., unstructured data 136). The natural language query associated with the structured data 104 is an unstructured version of the structured data such as a natural language sentence, keyword, and/or phrase that flags the filters set in the structured data 104. In other words, the natural language query associated with the structured data example is a natural language version of the structured search query, where the natural language version causes a search defined by the structured search query. For example, given a structured data 104 example such as "Seniority=Product Manager" and "Location=San Francisco" the unstructured data 138 can include a sentence such as "find me product managers in the Bay Area" or keyword searches such as "PMSF." Accordingly, the NLP engine 150 generates unstructured data 136 (e.g., a natural language query) that would result in the search query 122 associated with the structured data 104. The unstructured data 136 and corresponding structured data 104 can be stored as input-output pairs 110. An example of generating an unstructured version of a structured search query is described in FIG. 2, described herein.

In some embodiments, for a single structured data example 104, the LLM 152 generates multiple unstructured data examples 136. For example, a first unstructured data 136 example includes a keyword corresponding to the structured data 104, a second unstructured data 136 example includes a first sentence corresponding to the structured data 104, and a third unstructured data 136 example includes a second sentence corresponding to the structured data 104. Accordingly, for a single structured data 104 example, multiple unstructured data 136 examples are generated by the LLM 152. In this manner, the LLM 152 generates a diverse set of unstructured data 136 examples of the structured data. In other words, there can be multiple unstructured versions of a single natural language query. Accordingly, an input-output pair 110 can include a single structured data example 104 and multiple corresponding unstructured data examples 136.

In some embodiments, one or more of the unstructured data 136 examples are reviewed (e.g., by an administrator) before being stored in the storage system 140. In some embodiments, the unstructured data 136 examples are revised before being stored in the storage system 140.

As described herein, the structured data 104 and unstructured data 136 (e.g., input-output pairs 110) can be used to train one or more downstream machine learning models. The more examples of unstructured data 136 generated by the LLM 152, the more likely the one or more downstream models trained using structured data 104 and unstructured data 136 iteratively develop statistical correlations that map the natural language text of unstructured data 136 to the corresponding filter types and filter values of the structured data 104.

Figure 2:
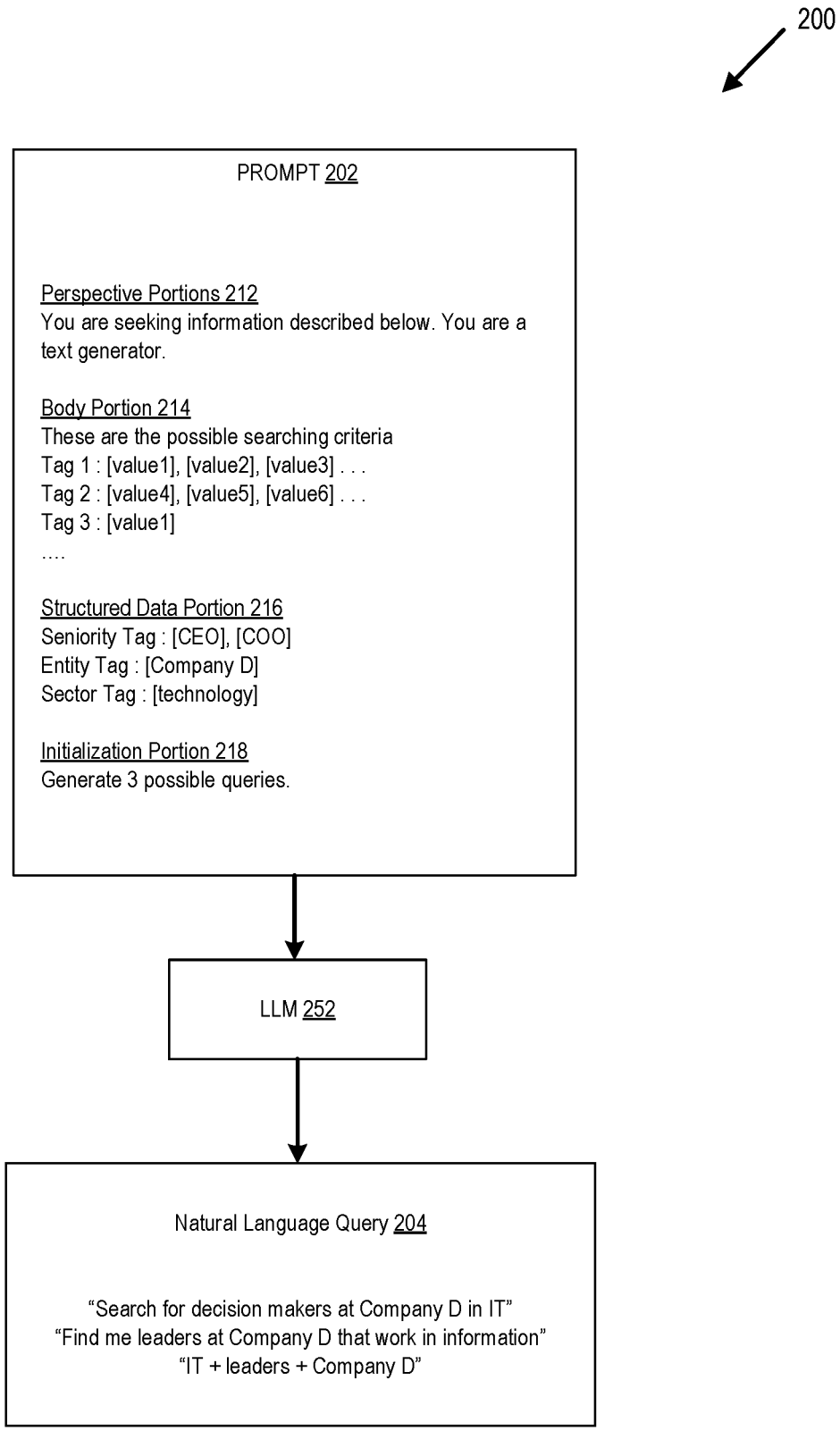
FIG. 2 is an example flow diagram for generating unstructured data using a structured representation of data, in accordance with some embodiments of the present disclosure.

FIG. 2 is an example flow diagram for generating unstructured data using a structured representation of data, in accordance with some embodiments of the present disclosure.

As described herein, a prompt instructs a LLM of one or more tasks to be performed by the LLM. Example 200 illustrates a portion of prompt 202 passed to LLM 252 to generate natural language query 204. While example 200 illustrates four portions of prompt 202 (e.g., perspective portion 212, body portion 214, structured data portion 216, and initialization portion 218), other portions of a prompt can be included in prompt 202 and passed to LLM 252.

The perspective portion 212 is a portion that defines the role of the language model. For example, the perspective portion 212 states that the language model is "A" with a task of performing "B." The role of the language model adjusts how the LLM 252 generates natural language query 204. For example, the role of the language model can be used to instruct the LLM 252 to generate a natural language query 204 associated with a particular domain.

In some embodiments, the perspective portion 212 can be used to define that the LLM 252 should mimic a person from a geographic area. In a non-limiting example, if the LLM 252 is instructed to mimic the behavior of a person from a geographic area (such as Texas) using the perspective portion 212, the generated natural language query 204 can include preferences of people from that geographic area (e.g., using increased contractions or including vocabulary such as "yall"). Accordingly, the generated example of the natural language query 204 is associated with a first domain (e.g., people from the specified geographic area). Additionally or alternatively, the perspective portion 212 can be used to define that the LLM 252 should mimic vocabulary or other preferences of people with certain attributes (e.g., job title) and/or age group. Accordingly, if the LLM 252 mimics the behavior of a generation Z person (people that share the same age group) based on an instruction in the prompt 202 (e.g., the perspective portion 212), the generated natural language query 204 can include a description of something to be searched such as "lead singer of the Foo Fighters" instead of the search query "Dave Grohl." The generated example of the natural language query 204 is associated with a second domain (e.g., people of a certain age group such as Gen Z). Accordingly, the LLM 252 can be instructed to generate natural language queries associated with different domains such that the generated natural language queries associated with a single structured search query are diverse.

The body portion 214 defines the possible searching criteria that an information retrieval system uses to filter search results. The possible searching criteria includes filter types and filter values. Each of the filter types are tagged entities that the information retrieval system can use to search for content items. Accordingly, for n possible filter types, there are n tags. Each filter type is associated with one or more filter values. The possible filter values associated with each filter type is represented as "value #." As shown, filter types can have the same number or different number of filter values. Moreover, filter values are not necessarily mutually exclusive (e.g., tag 1 and tag 3 share the same filter value 1). In some embodiments, the body portion 214 includes a natural language description of the tags and/or value. For example, Tag 1 can be associated with the "seniority" filter type and be defined as the current job title or occupation of a leader.

The prompt 202 also includes structured data portion 216. The structured data represents searched for content using the filter types and/or filter values defined in the set of possible filter types and/or filter values in the body portion 214. As described with reference to FIG. 1, the structured data can include stored search queries 122. The structured data of the structured data portion 216 corresponds to an executed search query and includes filter values and/or filter types defined in the body portion 214. In some embodiments, the structured data portion 216 of prompt 202 can include multiple search queries. For example, a first set of filter types and corresponding filter values correspond to a first search query and a second set of filter types and corresponding filter values corresponding to a second search query. Each of the tags in the structured data portion 216 are included in the body portion 214 as possible filter types of a search query. Similarly, each of the values in the structured data portion 216 are included in the body portion 214 as possible filter values corresponding to a filter type. While a filter type may have m possible filter values, the filter values included in the structured data portion 216 can be less than m, indicating a selection of filter values of the possible set of filter values. For example, a user search query included a search for CEOs and COOs of a company (filter values) even though the possible filter values associated with the filter type (seniority) included other filter values such as VP, President, Senior Manager, etc.

The prompt 202 also includes an initialization portion 218, which instructs the LLM to perform the task described in the prompt 202. As shown, the LLM 252 generates three natural language queries 204 based on the search query in the structured data portion 216. That is, the LLM 252 generates a diverse set of unstructured data versions of the structured data.

In operation, the initialization portion 218 causes the LLM 252 to perform a text generation task similar to that of next sentence prediction and/or next word prediction task. For example, given a string including filter types and filter values (defined in the structured data portion 216), the output of the LLM 252 is a probability distribution that represents a most likely natural language word (or phrase) associated with the filter type and/or filter value. Subsequent words or phrases in the natural language query 204 are based on the sequence of previous words to generate a natural language query that mimics a natural language query input by a user.

In some embodiments, the prompt 202 includes few-shot examples of unstructured data and corresponding structured data. For example, the prompt 202 can include one or more user-generated search queries (e.g., search query 122 described in FIG. 1) and one or more corresponding user-generated unstructured versions of the search query (e.g., unstructured data 136 described in FIG. 1). The corresponding user-generated unstructured version of the search query is a user-generated natural language query corresponding to the search query.

In some embodiments, retrieval augmented generation (RAG) is used to obtain few-shot examples of unstructured data and corresponding structured data. Obtaining data (e.g., user generated search queries such as search queries 122 and corresponding user-generated natural language queries stored as unstructured data 136 described in FIG. 1) using RAG beneficially provides the LLM 252 access to new vocabulary, new languages, new domains (e.g., groups of people that share one or more attributes such as age, geographic location, place of employment, job title, etc.) on the fly. Additionally, RAG beneficially allows the LLM 252 to stay up to date with current information. For example, few-shot examples of filter types and/or filter values provide the LLM 252 the updated filter-types and/or filter values. In a non-limiting example, RAG can be used to provide examples of natural language updates associated with searches for Fortune 500 companies (e.g., updates text associated with Fortune 500 companies such as the name of the companies, "Company 1" . . . "Company 500"). RAG can also be used to provide examples of the corresponding updated filter types and filter values associated with searches for Fortune 500 companies (e.g., updates to filter types and/or filter values that map to the natural language text such as "Fortune 500" or "largest companies in the US"). Accordingly, the LLM 252 iteratively develops statistical correlations of the updated relationship of natural language text and filter types and/or filter values.

Figure 3:
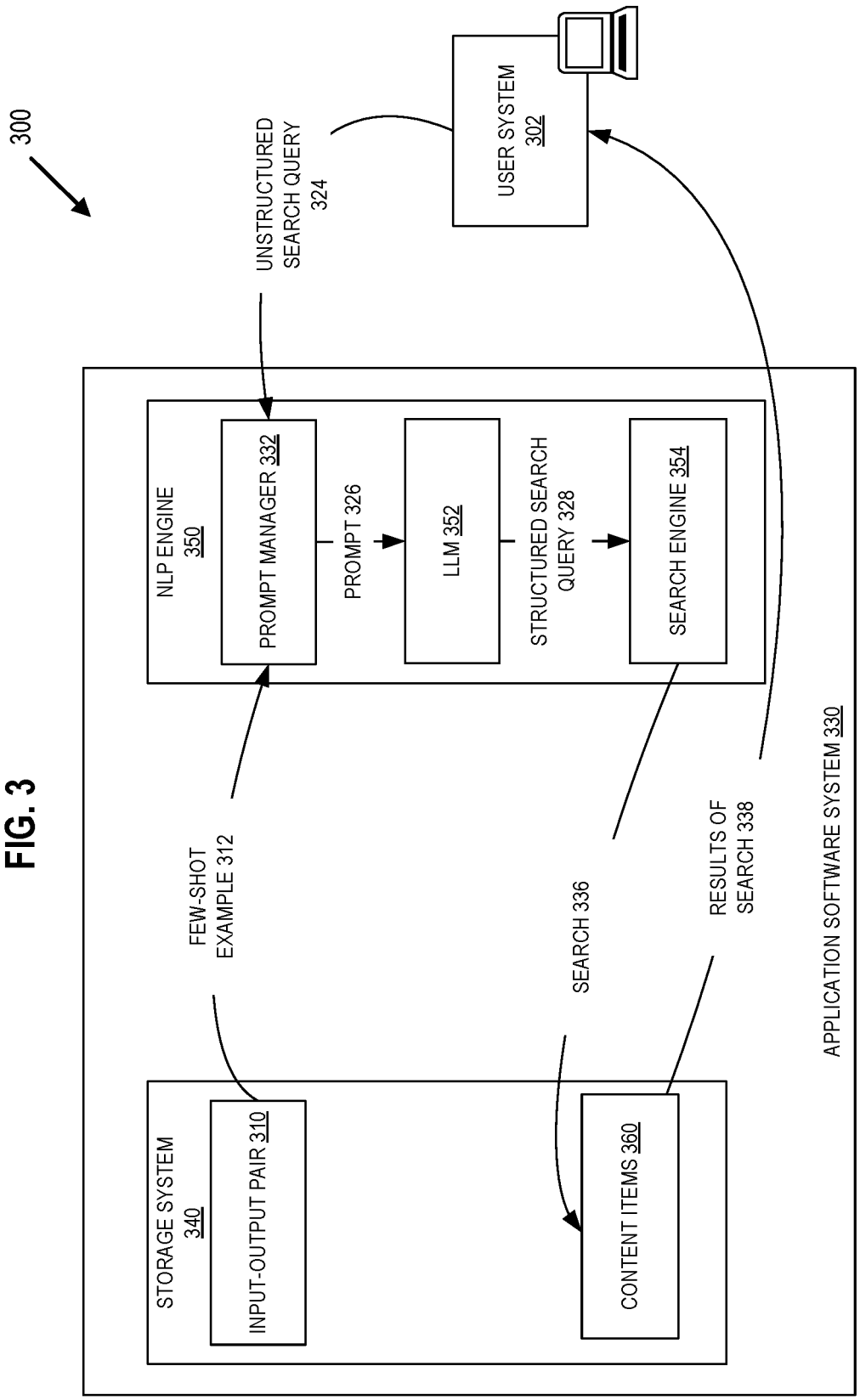
FIG. 3 is a flow diagram of an example method for deploying the NLP engine, in accordance with some embodiments of the present disclosure.

FIG. 3 is a flow diagram of an example method for deploying the NLP engine, in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of a NLP engine 750 of FIG. 7, including, in some embodiments, components shown in FIG. 7 that may not be specifically shown in FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In some embodiments, the components illustrated in computing system 300 are the same or similar as the corresponding components illustrated in the computing system 100 described in FIG. 1. For example, the components illustrated in the computing system 300 perform the same or similar operations described in FIG. 1.

As indicated in FIG. 3, a user using the user system 302 can provide an unstructured search query 324 to the NLP engine 350, using for example, a text interface provided by the NLP engine 350. The unstructured search query 324 can include natural language text of one or more keywords, one or more sentences, and/or one or more phrases to be searched by the application software system 330. In operation, the user of the user system 302 is requesting content items 360 corresponding to the unstructured search query 324.

The prompt manager 332 of the NLP engine 350 generates a prompt for the LLM 352. The prompt manager 332 can generate different prompts depending on the LLM 352. For example, if the LLM 352 is a pretrained LLM (such as CHAT GPT (OpenAI)), the prompt manager 332 generates prompt 326 that includes one or more few-shot examples 312, as described in FIG. 4, such that the LLM 352 can use the examples to map the unstructured search query 324 to the structured search query 328. Additionally or alternatively, if the LLM 352 is a fine-tuned LLM (as described in FIG. 6), the prompt manager 332 generates prompt 326 that may not include one or more few-shot examples 312 because the LLM 352 is trained to map the unstructured search query 324 to the structured search query 328.

In some embodiments, the prompt manager 332 can generate prompt 326 including one or more few-shot examples regardless of whether the LLM 352 is fine-tuned or pretrained to continuously provide the LLM 352 mappings between the unstructured search query 324 and the structured search query 328. That is, integrating few-shot examples into a prompt allows the LLM 352 to self-evolve as filter types, filter values, and natural language change. For example, natural language vocabulary can change, natural language style can change (e.g., acronyms), and natural language meaning of words or phrases can change (e.g., the companies listed as Fortune 500 companies). Retrieving few-shot examples 312 from the storage system 340 provides a mechanism that allows vocabulary, structured data (such as filter types and/or filter values), unstructured data (e.g., keyword searches, sentence searches) to change over time. For example, receiving few-shot examples of new vocabulary and/or new filter types allows the LLM 352 to iteratively develop statistical correlations used to map the new vocabulary and/or new filter types to unstructured data and structured data.

Figure 5:
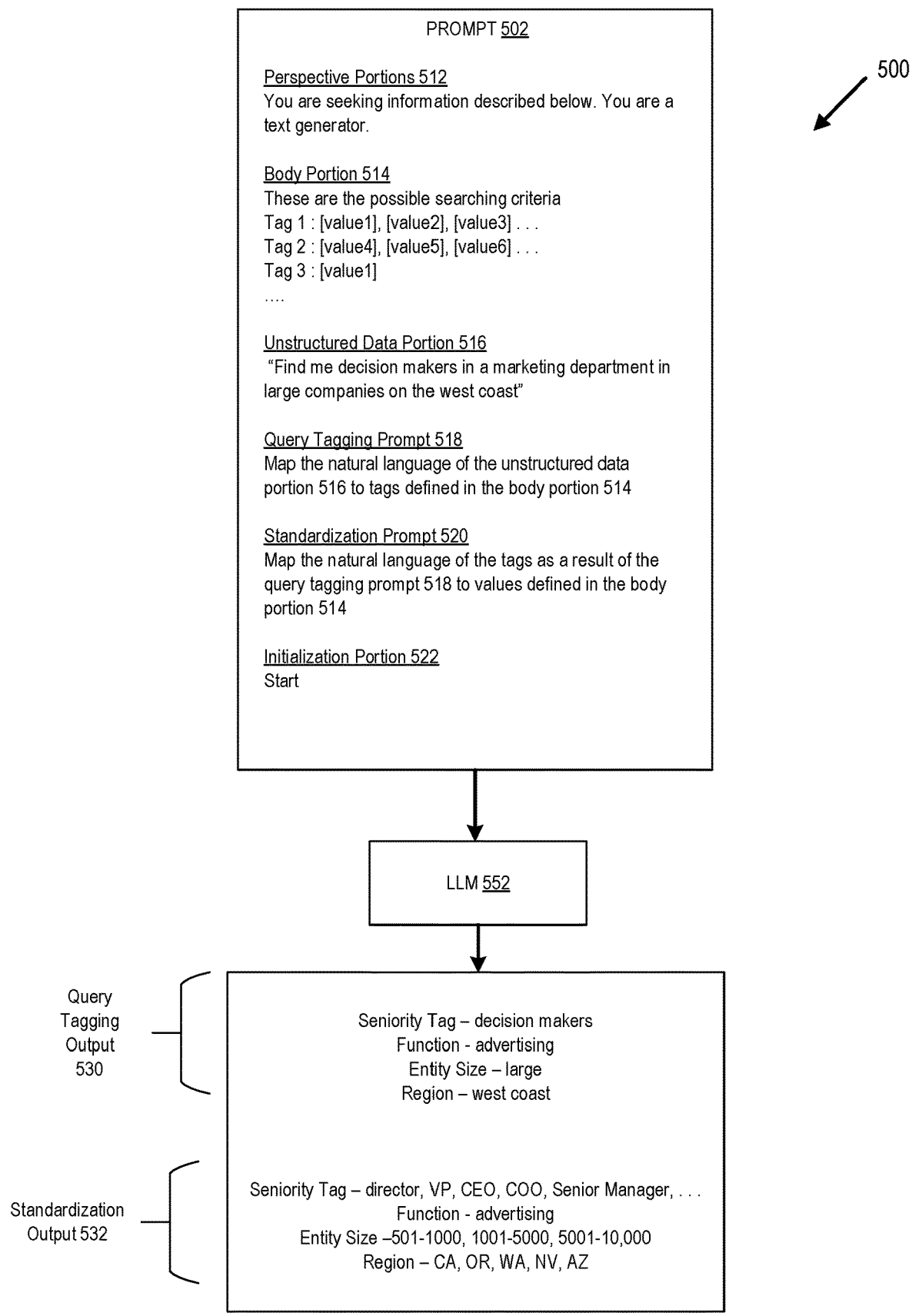
FIG. 5 is an example flow diagram for generating a structured version of a natural language query using batch prompts, in accordance with some embodiments of the present disclosure.

In some embodiments, the prompt manager 332 can include multiple prompts within prompt 326, as described in FIG. 5. As described herein, the inclusion of multiple prompts (e.g., batch prompts) within a single prompt 326 can instruct the LLM 352 to perform fine-grained mapping between the unstructured search query 324 and the structured search query 328. Performing fine-grained mapping between the unstructured search query 324 and the structured search query 328 causes the LLM 352 to map the unstructured search query 324 to both filter types and filter values. For example, including batch prompts within prompt 326 can establish statistical correlations that map natural language to a filter type (e.g., city) using a first prompt of the batch prompt, and subsequently establish statistical correlations that map the natural language to a filter value (e.g., Los Angeles) using a second prompt of the batch prompt. Accordingly, the mapping between the natural language search query and the structured search query can be fine-grained using batch prompting.

In some embodiments, each of the multiple prompts of the batch prompt included in prompt 326 are passed to the LLM 352 as independent prompts. For example, a first prompt 326 of the batch prompt is passed to the LLM 352 and a second prompt of the batch prompt is passed to the LLM 352.

The prompt manager 332 can obtain one or more few-shot examples 312 from the storage system 340 by querying the storage system 340. A few-shot example is an input-output pair including one or more unstructured search queries (e.g., natural language search queries) and corresponding structured search query. For example, an input-output pair 310 included as a few-shot example 312 can be an unstructured data example (such as unstructured data 136 described in FIG. 1) and corresponding structured data example (e.g., such as structured data 104 described in FIG. 1). The one or more unstructured search queries and corresponding structured search queries can be user-generated. Additionally or alternatively, as described in FIG. 1, the one or more unstructured search queries of the input-output pair may be generated using a LLM and a user-generated structured search query. In some embodiments, few-shot examples 312 include a mixture of user-generated data (e.g., unstructured search queries and/or corresponding structured search queries) and LLM-generated data (e.g., unstructured search queries).

In some embodiments, the prompt manager 332 obtains input-output pairs 310 as few-shot examples 312 of prompt 326 using RAG. RAG is used to query stored content to provide additional information to LLMs using the prompt. For example, RAG is used to select relevant input-output pairs (e.g., few-shot examples 312) from the stored input-output pairs 310.

Selecting relevant input-output pairs from the stored input-output pairs 310 using RAG can be determined by comparing the unstructured search query 324 to stored input-output pairs 310 using one or more similarity metrics such as embedding based retrieval. For example, one or more components of the NLP engine 350 (such as the prompt manager 332 or a different component) can encode the unstructured search query 324 to obtain one or more embeddings of the unstructured search query. For instance, the unstructured search query 324 is tokenized (e.g., partitioned into tokens including one or more words or one or more characters of the unstructured search query 324). One or more tokens are encoded into an embedding using an encoder, for instance. An embedding is a latent space representation of the token that encodes the meaning of the token in an embedding space. Tokens associated with similar meanings are positioned closer together in embedding space.

In some embodiments, the input-output pairs 310 are stored in the storage system 340 as token embeddings. For example, the unstructured data 136 described in FIG. 1 is tokenized and converted into one or more embeddings for storage, the structured data 104 described in FIG. 1 is tokenized and converted into one or more embeddings for storage, or some combination.

The one or more token embeddings of the unstructured search query 324 are compared to the token embeddings of the input-output pairs 310. In some embodiments, cosine similarity is applied to quantify the similarity between token embeddings of the unstructured data of the stored input-output pairs 310 and token embeddings of the unstructured search query 324. In some embodiments, cosine similarity is applied to quantify the similarity between token embeddings of the structured data of the stored input-output pairs 310 and token embeddings of the unstructured search query 324. In operation, the value of the cosine of the angle between the compared embeddings in embedding space indicates a similarity of embeddings. For example, higher, positive values (closer to 1) indicate greater degrees of similarity and lower, negative values (closer to 01) indicate greater degrees of dissimilarity. In some embodiments, the k most similar embedding pairs (e.g., the one or more embeddings of unstructured data compared to one or more embeddings of unstructured data of the input-output pair 310 or the one or more embeddings of unstructured data compared to one or more embeddings of structured data of the input-output pair 310) are selected as k relevant input-output pairs 310 to be used as few-shot examples 312 included in the prompt 326.

The prompt 326, which can include one or more few-shot examples 312 (as described in FIG. 4) and/or one or more batch prompts (as described in FIG. 5), is passed to the LLM 352. The LLM 352 executes the task instructed in the prompt 326 to generate a structured search query 328 based on the unstructured search query 324. Accordingly, the LLM 352 generates a structured version (structured search query 328) of an unstructured search query 324 by classifying filter types and/or filter values (e.g., structured search query 328) associated with text of the unstructured search query 324. In some embodiments, the structured search query 328 is in a JSON format including filter types (e.g., tags) and filter values (e.g., values) that constrain the search query.

The search engine 354 receives the structured search query 328 and executes a search 336 for content items 360 stored in the storage system 340. The search engine 354 searches databases that may be included in the application software system 330 and/or hosted by third parties. In some embodiments, the search engine 354 can be any information retrieval system. The search engine identifies content items 360 that are tagged with filter types and/or filter values received in the structured search query 328. As a result of the search 336, one or more results of the search 338 (e.g., content items 360) are presented for display to the user via the user system 302. In some embodiments, additional processing is performed on the results of the search 338 such as ranking the results of the search 338 based on relevance or the date of last update, for instance.

Figure 4:
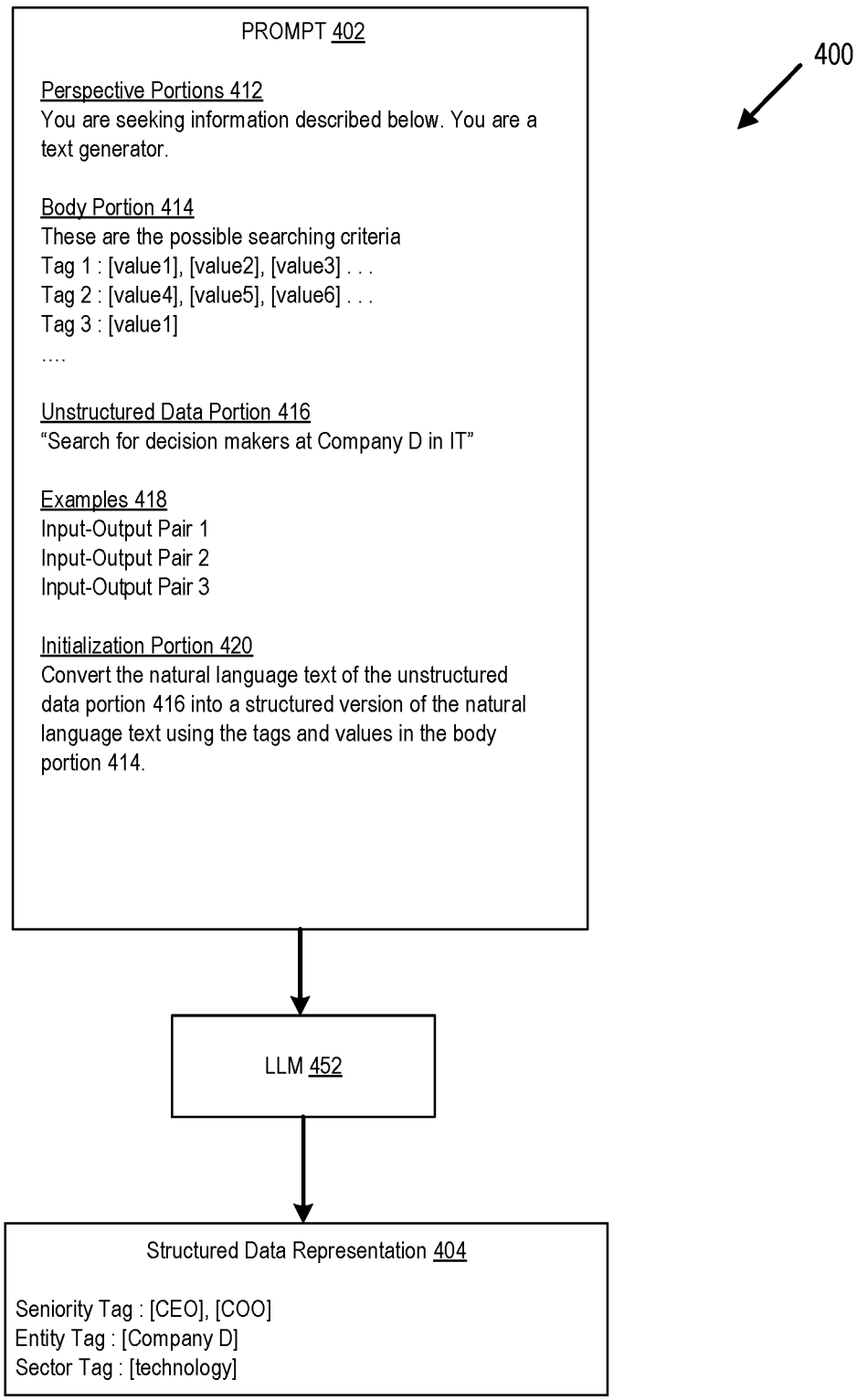
FIG. 4 is an example flow diagram for generating a structured version of a natural language query using few-shot examples, in accordance with some embodiments of the present disclosure.

FIG. 4 is an example flow diagram for generating a structured version of a natural language query using few-shot examples, in accordance with some embodiments of the present disclosure.

In some embodiments, the portions of prompt 402 are similar to the portions of prompt 202 described in example 200 of FIG. 2. For example, the perspective portion 412 is a portion that defines the role of the language model, and the body portion 414 defines the possible searching criteria that an information retrieval system (such as search engine 354 described in FIG. 3) uses to filter search results.

The prompt 402 includes an unstructured data portion 416. The unstructured data portion 416 includes a natural language search query (such as the unstructured search query 324 described in FIG. 3).

The prompt 402 also includes one or more examples 418 which include the relevant input-output pairs obtained from the storage system 340 described in FIG. 3. As described with reference to FIG. 3, relevant input-output pairs can be obtained using RAG, and specifically, by performing similarity metrics on embeddings (e.g., embeddings of the unstructured search query 324 compared to embeddings of the structured data of an input-output pair 310 or embeddings of the unstructured search query 324 compared to embeddings of the unstructured data of an input-output pair 310).

The prompt 402 also includes initialization portion 420 that instructs the LLM to perform the task described in the prompt 402. For example, the initialization portion 420 instructs the LLM 452 to generate the structured version of natural language text received in the unstructured data portion 416. The structured version of the natural language text includes mapping the natural language text of the unstructured data portion 416 to one or more tags defined in the body portion 414. In operation, the initialization portion 420 instructs the LLM 452 to perform a multi-class classification task, classifying filter types and/or filter values associated with natural language text. For example, the LLM 452 performs Named Entity Recognition (NER), which identifies and classifies natural language text as being associated with filter types and/or filter values. Accordingly, the LLM 452 maps natural language text in the unstructured data portion 416 to filter types and/or filter values defined in the body portion 414 by projecting the natural language text of the unstructured data portion 416 into an embedding space that enables the LLM 452 to identify filter types and/or filter values (e.g., structured search query 404) associated with the unstructured data portion 416.

As shown, the LLM 452 generates a structured data representation 404 based on the unstructured search query included in the unstructured data portion 416. The structured data representation 404 is the structured version of the natural language query. The structured data representation 404 includes tags corresponding to filter types and/or filter values defined in the body portion 414 of the prompt 402. In some embodiments, the LLM 452 is pretrained. In some embodiments, the LLM 452 is fine-tuned (as described in more detail in FIG. 6).

FIG. 5 is an example flow diagram for generating a structured version of a natural language query using batch prompts, in accordance with some embodiments of the present disclosure.

In some embodiments, the portions of prompt 502 are similar to the portions of prompt 202 described in example 200 of FIG. 2. For example, the perspective portion 512 is a portion that defines the role of the language model, the body portion 514 defines the possible searching criteria that an information retrieval system (such as search engine 354 described in FIG. 3) uses to filter search results, and the initialization portion 522 instructs the LLM to perform the task described in the prompt 502.

The prompt 502 includes an unstructured data portion 516. The unstructured data portion 516 includes a natural language search query (such as the unstructured search query 324 described in FIG. 3).

The prompt 502 also includes two sub-prompts (e.g., the query tagging prompt 518 and the standardization prompt 520) such that when prompt 502 is executed by the LLM 552, the LLM 552 executes both sub-prompts of the prompt 502. Performing tasks associated with multiple prompts (e.g., the query tagging prompt 518 and the standardization prompt 520) is referred to as batch prompting. While example 500 illustrates the prompt 502 including both the query tagging prompt 518 and the standardization prompt 520, in some embodiments one prompt 502 includes one sub-prompt (e.g., the query tagging prompt 518) and another prompt 502 includes another sub-prompt (e.g., the standardization prompt 520).

As shown in example 500, the output of the LLM 552 includes both the query tagging output 530 and the standardization output 532. The query tagging output 530 is an example of how the LLM 552 maps the natural language of the unstructured data portion 516 to tags (e.g., filter types) provided in the body portion 514. In operation, the LLM 552 performs a first multi-class classification task that classifies text of the unstructured data portion 516 as being associated with filter types. The standardization output 532 is an example of how the LLM 552 maps the natural language text identified in the query tagging output 530 to values provided in the body portion 514 that are associated with the tag identified in the query tagging output 530. In operation, the LLM 552 performs a second multi-class classification task that classifies text associated with the tags identified in the query tagging output as being associated with filter values.

Instructing the LLM 552 to map the natural language in the unstructured data portion 516 to tags and subsequently map the natural language in the query tagging output 530 constrains the mapping problem. That is, instead of mapping the natural language text of the unstructured data portion 516 to any filter value identified in the body portion 514, the natural language text of the query tagging output 530 is mapped to constrained filter values identified by the tags in the query tagging output 530.

Figure 6:
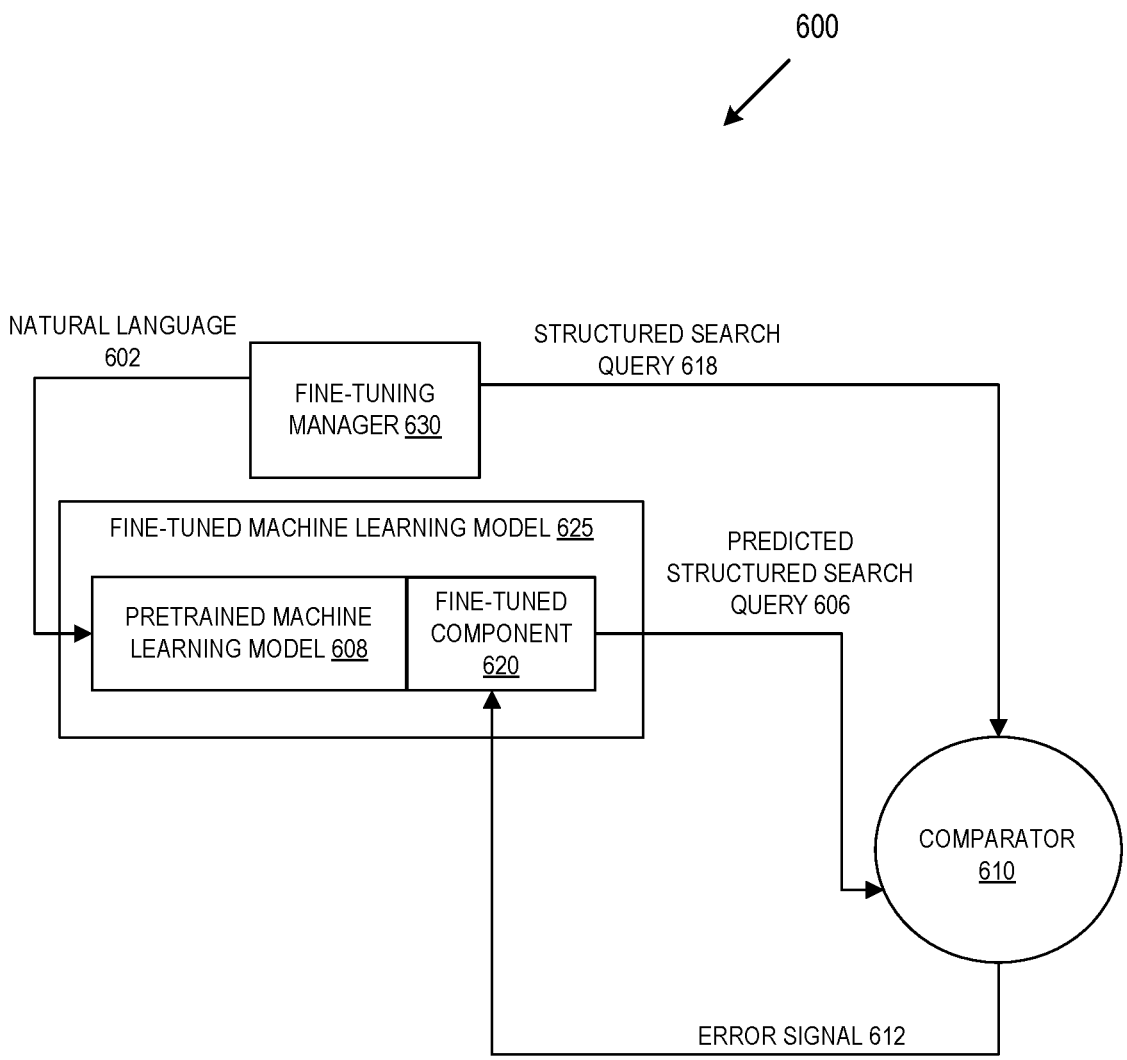
FIG. 6 is an example method for fine-tuning a large language model, in accordance with some embodiments of the present disclosure.

FIG. 6 is an example method for fine-tuning a large language model, in accordance with some embodiments of the present disclosure.

The pretrained machine learning model 608 is a machine learning model that is trained to perform one or more natural language tasks. The pretrained machine learning model 608 can be any sequence-to-sequence machine learning model. For example, the pretrained machine learning model 608 can include an instance of a text-based encoder-decoder model that accepts a string as an input (e.g., a natural langue search query) and outputs a string (e.g., structured version of the natural language search query). In some embodiments, the structured search query is in a format such as JSON or SQL. In some embodiments, the pretrained machine learning model 608 can be a version of GPT.

A layer may refer to a sub-structure of the pretrained machine learning model 608 that includes a number of nodes (e.g., neurons) that perform a particular computation and are interconnected to nodes of adjacent layers. Nodes in each of the layers sum up values from adjacent nodes and apply an activation function, allowing the layers to detect nonlinear patterns. Nodes are interconnected by weights, which are adjusted based on an error during a training phase. The adjustment of the weights during training enables the pretrained machine learning model 608 to, after training, generate a structured version of a natural language query with a certain degree of confidence or reliability.

The pretrained machine learning model 608 includes one or more self-attention layers that are used to attend (e.g., assign weight values) to portions of the model input (e.g., natural language 602). Alternatively, or in addition, the pretrained machine learning model 608 includes one or more feed-forward layers and residual connections that allow the pretrained machine learning model 608 to encode or decode complex data patterns including relationships between different portions of the model input in multiple different contexts.

In operation, the output of the pretrained machine learning model 608 is a probability distribution that represents a most likely mapping of natural language text to filter types and/or filter values. For example, given 37 filter types included in the prompt to the pretrained machine learning model 608 (e.g., possible search criteria that can be applied to search results defined in the body portion 414 of prompt 402 of FIG. 4 or the body portion 514 of prompt 502 of FIG. 5), the output of the pretrained machine learning model 608 is a probability distribution over the 37 possible filter types representing a mapping of the natural language text to a filter type of the 37 possible filter types. The pretrained machine learning model 608 can be pretrained using any training method such as supervised learning, unsupervised learning, semi-supervised learning, reinforcement learning, etc.

Fine-tuning the pretrained machine learning model 608 allows the pretrained machine learning model 608, which has a general natural language understanding, to perform specific tasks. As shown, the fine-tuned component 620 together with the pretrained machine learning model 608 results in the fine-tuned machine learning model 625. The fine-tuning manager 630 fine-tunes the fine-tuned component 620 causing the fine-tuned machine learning model 625 to determine predicted structured search query 606 with high accuracy. In other words, the predicted structured search query 606 is similar or the same as structured search query 618 (e.g., user-generated search queries such as search query 122 described in FIG. 1).

The fine-tuned component 620 can include one or more weight matrices appended to a weight matrix in the pretrained machine learning model 608 and one or more layers appended to one or more layers of the pretrained machine learning model 608. While one fine-tuned component 620 is shown, it should be appreciated that multiple fine-tuned components 620 can be appended to layers and/or weights of the pretrained machine learning model 608.

As a result of the fine-tuned component 620 applied to the pretrained machine learning model 608, the fine-tuned machine learning model 625 iteratively develops statistical correlations that encode filter types and/or filter values in the fine-tuned machine learning model 625. That is, the fine-tuned machine learning model 625 maps natural language text to filter types and/or filter values thereby converting unstructured data to structured data. In operation, the fine-tuned machine learning model 625 classifies text of the unstructured data as being associated with filter types and/or filter values.

Supervised learning is a method of training (or fine-tuning) a machine learning model given input-output pairs, where the output of the input-output pair is known (e.g., an expected output, a labeled output, a ground truth). While supervised learning is described, other training methods including semi-supervised learning or federated learning can be used to fine-tune the pretrained machine learning model 608.

In the example 600, the fine-tuning manager 630 provides a prompt including the natural language 602 (e.g., the unstructured data 136 described in FIG. 1, which can include user-generated natural language queries or LLM-generated natural language queries) to the pretrained machine learning model 608. In some embodiments, the prompt can include additional information such as filter types and/or corresponding filter values of possible searching criteria (e.g., the body portion 414 of prompt 402 of FIG. 4 or the body portion 514 of prompt 502 of FIG. 5). The pretrained machine learning model 608 and the fine-tuned component 620 then determines predicted structured search query 606 by applying the weights and nodes of the pretrained machine learning model 608 and the weights and/or nodes of the fine-tuned component 620 to the natural language 602. The predicted structured search query 606 is the most likely mapping (e.g., highest scoring probability) of natural language text to filter types and/or filter values based on the probability distribution over the possible filter types.

The error (represented by the error signal 612) is determined by comparing the predicted structured search query 606 to the structured search query 618 using the comparator 610. In some embodiments, the comparator 610 evaluates the similarity between the predicted structured search query 606 to the structured search query 618 using any similarity metric. For example, the comparator 610 can score the filter types and/or filter values set in the structured search query 618 to the filter types and/or filter values set in the predicted structured search query 606 to measure how many filters the pretrained machine learning model 608 and the fine-tuned component 620 set correctly (e.g., an accuracy measure). The comparator 610 can also measure the number of false positives (e.g., the number of filter types and/or filter values that are set in the predicted structured search query 606 that are not set in the structured search query 618) and false negatives (e.g., the number of filter types and/or filter values that are not set in the predicted structured search query 606 and that are set in the structured search query 618).

The error signal 612 is used to adjust the fine-tuned component 620 (e.g., the value of weights in a weight matrix included in the fine-tuned component 620 and/or the number of layers and/or arrangement of layers included in the fine-tuned component 620). The adjustment of the fine-tuned component 620 during training enables the fine-tuned machine learning model 625 to iteratively develop statistical correlations used to map the natural language text of the natural language 602 to the predetermined filter types and/or filter values included in the structured search query 618.

The fine-tuned component 620 and/or pretrained machine learning model 608 may be trained using a backpropagation algorithm, for instance. The backpropagation algorithm operates by propagating the error signal 612 through each of the algorithmic weights of the fine-tuned component 620 and/or pretrained machine learning model 608 such that the algorithmic weights adapt based on the amount of error. The error signal 612 may be calculated at each iteration (e.g., each input-output pair such as natural language 602 and structured search query 618), batch, and/or epoch. The error is computed using a loss function. An example loss function includes the cross-entropy error function. After a set of training iterations, the fine-tuned machine learning model 625 iteratively converges, e.g., changes over time to generate an acceptably accurate (e.g., accuracy satisfies a defined tolerance or confidence level) predicted structured search query 606 using the natural language 602 and the structured search query 618. The value of the weights is stored such that the fine-tuned machine learning model 625 can be deployed during inference time.

In some embodiments, the fine-tuned component 620 is not included in the fine-tuned machine learning model 625 and instead, the weights of the pretrained machine learning model 608 are updated during fine-tuning to obtain the fine-tuned machine learning model 625.

In some embodiments, the machine learning model (e.g., the pretrained machine learning model 608 or the fine-tuned machine learning model 625) generates the natural language 602 using the structured search query 618. That is, the input to the pretrained machine learning model 608 is the structured search query 618 and the output is natural language 602. Subsequently, the input to the pretrained machine learning model 608 is the natural language 602 and the output is the predicted structured search query 606. Accordingly, the machine learning model iteratively develops statistical correlations used to map unstructured natural language and the filter types and/or filter values of the structured search queries.

This dual-stage transformation of data (e.g., in a first stage, generating an unstructured version (natural language query) of a search query and in a second stage, generating a structured version (search query) of the natural language query) can fine-tune the pretrained machine learning model 608 by nature of the pretrained machine learning model 608 learning the specific unstructured and structured mappings during training. Accordingly, the pretrained machine learning model 608 becomes the fine-tuned machine learning model 625. Using the same LLM to transform structured data into natural language queries and back into structured data is a unique iterative process that beneficially leverages the bidirectional relationship of the natural language and the structured search queries. For example, the pretrained machine learning model 608 transforms the structured search queries (such as structured search queries 618) into natural language (such as natural language 602) in such a way that enables the fine-tuned machine learning model 625 to more accurately and more robustly map the natural language 602 back into structured search queries 618.

While fine-tuning the pretrained machine learning model 608 and the fine-tuned component 620 is described using input-output pairs (e.g., input-output pairs 110 including structured data 104 and unstructured data 136 described in FIG. 1), in some embodiments, the input-output pairs can be used to validate the fine-tuned machine learning model 625 using a validation dataset. In some embodiments, after training, the fine-tuned machine learning model 625 is validated using a validation dataset. The fine-tuned machine learning model 625 is validated by providing an input (such as natural language 602) and receiving an output (such as the predicted structured search query 606). The predicted structured search query 606 can be compared to the structured search query 618 using the comparator 610 but the error signal 612 is not passed to the fine-tuned machine learning model 625, as is done during fine-tuning described above. Instead, the error signal 612 can be stored and used to determine whether the fine-tuned machine learning model 625 is operational within a threshold error margin. For example, the error signal 612 is compared to a threshold error to determine whether the error signal 612 satisfies the threshold error margin.

The input-output pairs (e.g., input-output pairs 110 including structured data 104 and unstructured data 136 described in FIG. 1) can be partitioned into training data and validation data in several ways. In some embodiments, the fine-tuning manager 630 splits input-output pairs into training data and validation data randomly. That is, a first portion of the input-output pairs are used during training, and a second portion different from the first portion of the input-output pairs are used during validation. Accordingly, only the first portion of the input-output pairs are used during training and only the second portion of the input-output pairs are used during validation.

In other embodiments, the fine-tuning manager 630 performs k-fold cross validation to partition data into training data and validation data. This method of partitioning data allows the same input-output pairs (e.g., input-output pairs 110 including structured data 104 and unstructured data 136 described in FIG. 1) to be used for both training and validation. In a first step, the data may be randomly split into k folds. For higher values of k, there may be a smaller likelihood of bias (e.g., the inability of a model to capture a relationship), but there may be a larger likelihood of variance (e.g., overfitting the model). For lower values of k, there may be a larger bias (e.g., indicating that not enough data may have been used for training) and less variance. In a second step, k−1 folds are used for training (e.g., by the fine-tuning manager 630) and the kth fold may be used for validation.

Figure 7:
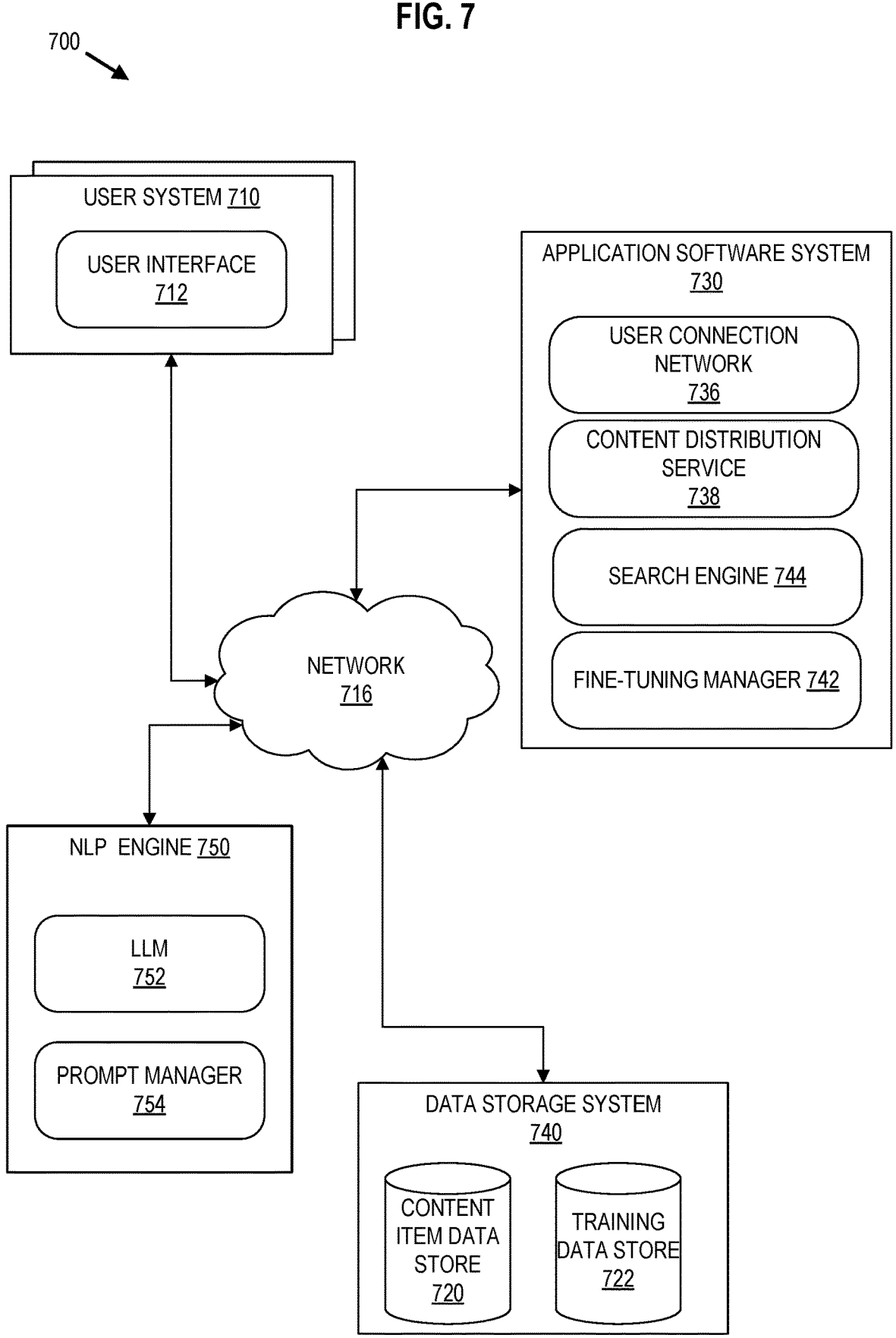
FIG. 7 is a block diagram of a computing system that includes a NLP engine, in accordance with some embodiments of the present disclosure.

FIG. 7 is a block diagram of a computing system that includes a NLP engine, in accordance with some embodiments of the present disclosure.

In the embodiment of FIG. 7, a computing system 700 includes one or more user systems 710, a network 716, an application software system 730, an NLP engine 750, and a data storage system 740. All or at least some components of the NLP engine 750 are implemented at the user system 710, in some implementations. For example, the NLP engine 750 can be implemented directly upon a single client device without the need to communicate with, e.g., one or more servers over the Internet. Dashed lines are used in FIG. 7 to indicate that all or portions of the NLP engine 750 can be implemented directly on the user system 710, e.g., the user's client device and/or the application software system 730.

A user system 710 includes at least one computing device, such as a personal computing device, a server, a mobile computing device, or a smart appliance, and at least one software application that the at least one computing device is capable of executing, such as an operating system or a front end of an online system. A typical user of user system 710 can be an end user of application software system 730 (such as a user searching for digital content of the application software system 730) and/or an administrator (such as a user reviewing search queries to save, reviewing generated natural language versions of structured search queries, generating search queries and/or generating natural language queries corresponding to search queries).

Many different user systems 710 can be connected to network 716 at the same time or at different times. Different user systems 710 can contain similar components as described in connection with the illustrated user system 710. For example, many different end users of computing system 700 can be interacting with many different instances of application software system 730 through their respective user systems 710, at the same time or at different times.

User system 710 includes a user interface 712. User interface 712 is installed on or accessible to user system 710 by network 716. The user interface 712 can include, for example, a graphical display screen that includes graphical user interface elements such as at least one input box or other input mechanism and at least one slot. A slot as used herein refers to a space on a graphical display such as a web page or mobile device screen, into which natural language text can be entered by a user and digital content items can be provided for display to the user. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system.

User interface 712 can be used to input data such as a search query and receive content such as digital content items and/or landing page results. For example, user interface 712 can include a graphical user interface (GUI), a conversational voice/speech interface, a virtual reality, augmented reality, or mixed reality interface, and/or a haptic interface. User interface 712 includes a mechanism for logging in to application software system 730, clicking or tapping on GUI user input control elements, entering a search criteria (using natural language text) interacting with search results, interacting with filters and/or filter values (e.g., check boxes, list items, or selectable button-shaped graphics) and displaying digital content items. Examples of user interface 712 include web browsers, command line interfaces, and mobile app front ends. User interface 712 as used herein can include application programming interfaces (APIs).

Network 716 includes an electronic communications network. Network 716 can be implemented on any medium or mechanism that provides for the exchange of digital data, signals, and/or instructions between the various components of computing system 700. Examples of network 716 include, without limitation, a Local Area Network (LAN), a Wide Area Network (WAN), an Ethernet network or the Internet, or at least one terrestrial, satellite or wireless link, or a combination of any number of different networks and/or communication links.

Application software system 730 includes any type of application software system that provides or enables the creation, upload, display, and/or distribution of at least one form of digital content, including user profiles, articles, comments, and videos between or among user systems, such as user system 710, through user interface 712. In some implementations, portions of the NLP engine 750 are components of application software system 730. Components of application software system 730 can include user connection network 736, content distribution service 738, search engine 744, and fine-tuning manager 742.

User connection network 736 includes, for instance, a social network service, professional social network software and/or other social graph-based applications. Content distribution service 738 includes, for example, a chatbot or chat-style system, a messaging system, such as a peer-to-peer messaging system that enables the creation and exchange of messages among users of application software system 730, or a news feed.

In the example of FIG. 7, application software system 730 includes a search engine 744. Search engine 744 is a software system designed to search for and retrieve information by executing queries on data stores, such as databases, connection networks, and/or graphs. The queries are designed to find information that matches specified criteria, such as keywords and phrases. Search engine 744 enables users of application software system 730 to input and execute search queries on user connection network 736 and/or one or more indexes or data stores that store retrievable items, such as digital items that can be retrieved and included in a list of search results. Application software system 730 can include online systems that provide social network services, general-purpose search engines, specific-purpose search engines, messaging systems, content distribution platforms, e-commerce software, enterprise software, or any combination of any of the foregoing or other types of software. For example, one or more search engines of the user connection network 736 call the NLP engine 750 to receive structured versions of natural language search queries entered by a user (e.g., via user system 710). As described herein, the NLP engine 750 generates a structured version of a received natural language query. That is, the NP engine 750 maps the natural language text to one or more predetermined filter types and/or filter values.

A front-end portion of application software system 730 can operate in user system 710, for example as a plugin or widget in a graphical user interface of a web application, mobile software application, or as a web browser executing user interface 712. In an embodiment, a mobile app or a web browser of a user system 710 can transmit a network communication such as an HTTP (HyperText Transfer Protocol) request over network 716 in response to user input that is received through a user interface provided by the web application, mobile app, or web browser, such as user interface 712. A request is formulated, e.g., by a browser or mobile app at a user device, in connection with a user interface event such as an entered natural language search query. The request includes, for example, a network message such as an HTTP request for a search of digital content (e.g., a transfer of data from an application front end to the application's back end, or from the application's back end to the front end, or, more generally, a request for a transfer of data between two different devices or systems, such as data transfers between servers and user systems). A server running application software system 730 can receive the input from the web application, mobile app, or browser executing user interface 712, perform at least one operation using the input, and return output to the user interface 712 using a network communication such as an HTTP response, which the web application, mobile app, or browser receives and processes at the user system 710.

In the example of FIG. 7, the application software system 730 includes a fine-tuning manager 742. In other examples, the fine-tuning manager 742 is included as part of the NLP engine 750. The fine-tuning manager 742 can train or fine-tune one or more machine learning models. For example, the fine-tuning manager 742 can fine-tune a pre-trained language model to generate a structured version of a natural language query, as described in FIG. 6. For example, the fine-tuned model iteratively develops statistical correlations used to map natural language text to filter values and/or filter types.

The NLP engine 750 can be used to generate training data and also generate a structured version of a natural language query. The NLP engine 750 shifts the burden of selecting filter types and/or filter values that are associated with a desired search query from the user, to the NLP engine 750 using LLM 752 and prompt manager 754. That is, the prompt manager 754 and LLM 752 automate the selection of filter types and/or filter values associated with a desired search query.

The LLM 752 can generate training data. The generated training data includes natural language queries associated with a search query. Each of the generated natural language queries can represent a keyword, sentence, partial sentence or other natural language query that would result in the search query. Accordingly, the LLM 752 generates a diverse set of natural language queries associated with a single structured search query.

The LLM 752 can also generate structured versions of natural language queries. For example, given a natural language search query for digital content items, the LLM 752 maps the natural language text to filter types and/or filter values used to search for the digital content items. The LLM 752 outputs a structured search query that can be used to search for the digital content items.

In some embodiments, a different LLM (or the same LLM) can use the generated training data. For example, a first LLM generates the training data and a second LLM uses the generated training data as few-shot examples during deployment to generate structured versions of natural language queries. In some embodiments, an LLM can be fine-tuned using the generated training data.

The prompt manager 754 provides the instructions for the LLM 752 in the form of a prompt. Different instructions can be passed to the LLM 752. For example, the prompt manager 754 can instruct the LLM 752 to generate training data using a first prompt, and the prompt manager 754 can instruct the LLM 752 to generate structured versions of natural language queries using few-shot examples including training data in a second prompt. Additionally, the prompt manager 754 can generate different prompts depending on the LLM. For example, a first LLM may be a pretrained LLM such that a prompt generated by the prompt manager 754 includes few-shot examples of training data. In a different example, a second LLM is a fine-tuned LLM such that the prompt generated by the prompt manager 754 does not include few-shot examples of training data. In some embodiments, the prompt manager 754 can generate prompts including one or more few-shot examples regardless of whether the LLM 752 is fine-tuned or pretrained to continuously provide the LLM 752 mappings between the unstructured search query and the structured search query.

In some embodiments, the prompt manager 754 can include multiple prompts within a prompt. As described herein, the inclusion of multiple prompts (e.g., batch prompts) within a single prompt can establish statistical correlations in support of fine-grained mappings between the unstructured search query and the structured search query.

Data storage system 740 includes data stores and/or data services that store digital data received, used, manipulated, and produced by application software system 730 and/or NLP engine 750, including a content item data store 720, and training data store 722.

The content item data store 720 stores digital content items hosted by the application software system 730, generated by the application software system 730, uploaded to the application software system 730, and the like. In some embodiments, digital content is tagged with privacy settings such that only users with one or more credentials have access to the tagged digital content. In some embodiments, the digital content is tagged with filter types and/or filter values corresponding to the digital content. For example, a digital article about the job market in Los Angeles may be tagged with such tags as "Los Angeles" and "Employment." Such tags correspond to filter types and/or filter values used to retrieve the digital content from the content item data store 720.

The training data store 722 stores pairs of training data (e.g., input-output pairs). As described herein, an input-output pair includes a structured search query and corresponding one or more natural language descriptions of the structured search query. The training data store 722 can be queried to obtain samples of data used as few-shot examples. The structured search queries stored in the training data store 722 can be search queries searched within a period of time (e.g., search queries entered within the last x months), search queries searched by particular entities and/or entities with one or more attributes (e.g., search queries entered by women in the legal profession, search queries searched by junior employees, search queries searched by companies in particular geographic areas, search queries searched by companies with a threshold number of employees, search queries entered by people of a certain age group), and search queries that were saved by a user, for instance.

In some embodiments, the data storage system 740 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of the data storage system 740 can be configured to store data produced in real-time and/or offline (e.g., batch) data processing. A data store configured for real-time data processing can be referred to as a real-time data store. A data store configured for offline or batch data processing can be referred to as an offline data store. Data stores can be implemented using databases, such as key: value stores, relational databases, and/or graph databases. Data can be written to and read from data stores using query technologies, e.g., SQL or NoSQL.

A key: value database, or key: value store, is a nonrelational database that organizes and stores data records as key: value pairs. The key uniquely identifies the data record, i.e., the value associated with the key. The value associated with a given key can be, e.g., a single data value, a list of data values, or another key: value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

The data storage system 740 resides on at least one persistent and/or volatile storage device that can reside within the same local network as at least one other device of computing system 700 and/or in a network that is remote relative to at least one other device of computing system 700. Thus, although depicted as being included in computing system 700, portions of data storage system 740 can be part of computing system 700 or accessed by computing system 700 over a network, such as network 716.

While not specifically shown, it should be understood that any of user system 710, application software system 730, NLP engine 750, and data storage system 740 includes an interface embodied as computer programming code stored in computer memory that when executed causes a computing device to enable bidirectional communication with any other of user system 710, application software system 730, NLP engine 750, or data storage system 740 using a communicative coupling mechanism. Examples of communicative coupling mechanisms include network interfaces, inter-process communication (IPC) interfaces and application program interfaces (APIs).

Each of user system 710, application software system 730, NLP engine 750, and data storage system 740 is implemented using at least one computing device that is communicatively coupled to electronic communications network 716. Any of user system 710, application software system 730, NLP engine 750, and data storage system 740 can be bidirectionally communicatively coupled by network 716. User system 710 as well as other different user systems (not shown) can be bidirectionally communicatively coupled to application software system 730 and/or NLP engine 750.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 710, application software system 730, NLP engine 750, and data storage system 740 are implemented using computer software, hardware, or software and hardware, and can include combinations of automated functionality, data structures, and digital data, which are represented schematically in the figures. User system 710, application software system 730, NLP engine 750, and data storage system 740 are shown as separate elements in FIG. 7 for ease of discussion but, except as otherwise described, the illustration is not meant to imply that separation of these elements is required. The illustrated systems, services, and data stores (or their functionality) of each of user system 710, application software system 730, NLP engine 750, and data storage system 740 can be divided over any number of physical systems, including a single physical computer system, and can communicate with each other in any appropriate manner.

Figure 8:
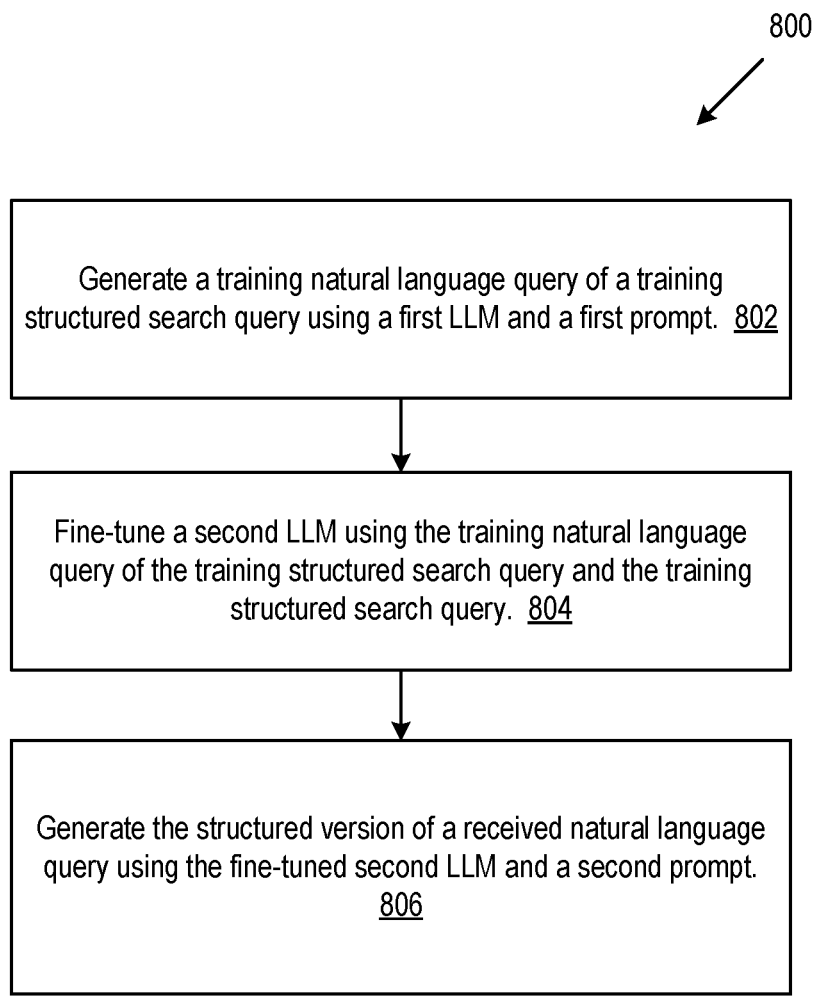
FIG. 8 is a flow diagram of an example method for using generated natural language queries to generate a structured data version of a received natural language query, in accordance with some embodiments of the present disclosure.

FIG. 8 is a flow diagram of an example method for using generated natural language queries to generate a structured data version of a received natural language query, in accordance with some embodiments of the present disclosure.

The method 800 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, one or more portions of method 800 is performed by one or more components of the NLP engine 750 of FIG. 7, or the NLP engine 150 of FIG. 1 or the NLP engine 350 of FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 802, a processing device generates a training natural language query of a training structured search query using a first LLM and a first prompt. The training structured search query is a query for digital content. For example, the training structured search query is used to retrieve specific digital content items of the set of content items. Applying filters to a search query constrains the set of search results. Accordingly, the training structured search query is a search query in a predetermined (e.g., structured) format. For example, the training structured search query can be a JavaScript Object Notation (JSON) data structure and the set of predetermined filters are predetermined objects in the JSON format. When a user applies a filter to a search query (e.g., training structured search query), the corresponding object in the JSON data is set, thereby acting as a constraint to the set of search results.

The first LLM generates the training natural language query. The training natural language query associated with the training structured search query is an unstructured version of the training structured search query such as a natural language sentence, keyword, and/or phrase that sets or otherwise flags filters (e.g., JSON objects) in the training structured search query. In other words, the training natural language query associated with the training structured search query is a natural language version of the training structured search query, where the natural language version causes a search defined by the training structured search query.

The first prompt can instruct the first LLM to generate training natural language queries corresponding to the training structured search query by including a list of the possible filter types and/or filter values flagged in the training structured search query. The filter types correspond to tags used to retrieve digital content items. The training structured search query includes at least one filter type (e.g., tag) in the list of possible filter types (e.g., tags) retrieved by an information retrieval system.

In some embodiments, the first LLM can be instructed to generate diverse training natural language queries associated with a training structured search query. For example, the first prompt can include instructions that define different roles of the LLM such that the LLM generates training natural language queries associated with the different roles. Each role of the LLM is a domain of the LLM. For example, the first LLM can be instructed to mimic the behavior of people from a particular geographic area. Accordingly, the first LLM generates training natural language queries from a first domain. The first LLM can also be instructed to mimic the behavior of people within a certain age group. Accordingly, the first LLM generates training natural language queries from a second domain.

In some embodiments, the first prompt includes one or more few-shot examples of training natural language queries and corresponding training structured search queries. The few-shot examples can be obtained using retrieval augmented generation. In some embodiments, the few-shot examples include user-generated search queries and corresponding user-generated unstructured versions of the user-generated search queries. For example, the user-generated unstructured version of the user-generated search query is a natural language description of the filter types and/or filter values applied to a search query to retrieve a digital content item.

At operation 804, the processing device fine-tunes a second LLM using the training natural language query of the training structured search query and the training structured search query. Fine-tuning the second LLM allows the second LLM, which has a general natural language understanding, to perform specific tasks. Fine-tuning includes training the second LLM using the training natural language query and the training structured search query. As a result, the second LLM iteratively develops statistical correlations that map filter types and/or filter values to natural language text, thereby converting unstructured data to structured data.

Accordingly, the fine-tuned second LLM can generate a structured version of a natural language query.

At operation 806, the processing device generates the structured version of a received natural language query using the fine-tuned second LLM and a second prompt. The second prompt can instruct the second LLM to generate the structured version of the received natural language query by including a list of the possible filter types and/or filter values that can be retrieved by an information retrieval system. The filter types correspond to tags used to retrieve digital content items. The structured version of the received natural language query includes at least one filter type (e.g., tag) in the list of possible filter types (e.g., tags) retrieved by the information retrieval system.

In some embodiments, the second prompt can include the training natural language query of the training structured search query and the training structured search query as few-shot examples. The training natural language query of the training structured search query and the training structured search query can be obtained using retrieval augmented generation.

In some embodiments, the second prompt can include batch prompts. A batch prompt is a prompt that instructs the LLM to perform multiple tasks. A first sub-prompt instructs the second LLM to map text of the received natural language query to a tag. For example, the second LLM maps text of a received natural language query to a filter type used to search for digital content by an information retrieval system. A second sub-prompt instructs the second LLM to map text of the received natural language query to a value corresponding to the tag. For example, each tag (e.g., filter types) is related to one or more filter values. The structured version of the received natural language query thus includes at least the filter type determined using the first sub-prompt of the second prompt and the filter value determined using the second sub-prompt of the second prompt.

Figure 9:
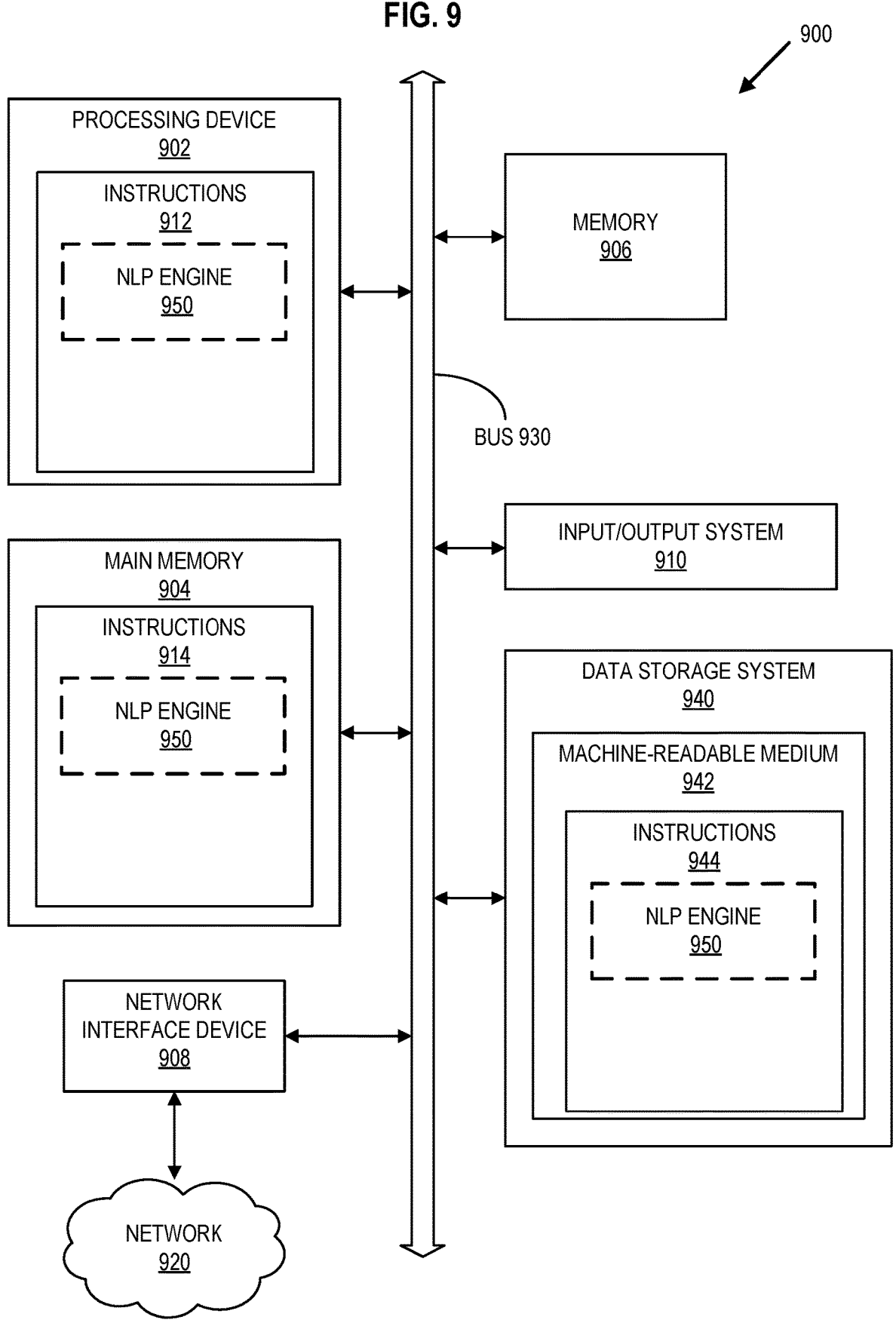
FIG. 9 is a block diagram of an example computer system including a NLP engine, in accordance with some embodiments of the present disclosure.

FIG. 9 is a block diagram of an example computer system including an NLP engine, in accordance with some embodiments of the present disclosure.

In FIG. 9, an example machine of a computer system 900 is shown, within which a set of instructions for causing the machine to perform any of the methodologies discussed herein can be executed. In some embodiments, the computer system 900 can correspond to a component of a networked computer system (e.g., as a component of the NLP engine 150 of FIG. 1, the NLP engine 350 of FIG. 3, or the NLP engine 750 of FIG. 7) that includes, is coupled to, or utilizes a machine to execute an operating system to perform operations corresponding to one or more components of the NLP engine 150 of FIG. 1, the NLP engine 350 of FIG. 3, or the NLP engine 750 of FIG. 7. For example, computer system 900 corresponds to a portion of computing system 100 when the computing system is executing a portion of the NLP engine 150 of FIG. 1.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a memory 903 (e.g., flash memory, static random access memory (SRAM), etc.), an input/output system 910, and a data storage system 940, which communicate with each other via a bus 930.

Processing device 902 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be at least one special-purpose processing device such as an application specific integrated circuit (ASIC), a field programmable gate array (FPGA), a digital signal processor (DSP), network processor, or the like. The processing device 902 is configured to execute instructions 912 for performing the operations and steps discussed herein.

In some embodiments of FIG. 9, NLP engine 950 represents portions of NLP engine 750 of FIG. 7 when the computer system 900 is executing those portions of NLP engine 950. Instructions 912 include portions of the NLP engine 950 when those portions of the NLP engine 950 are being executed by processing device 902. Thus, the NLP engine 950 is shown in dashed lines as part of instructions 912 to illustrate that, at times, portions of the NLP engine 950 are executed by processing device 902. For example, when at least some portion of the NLP engine 950 is embodied in instructions to cause processing device 902 to perform the method(s) described herein, some of those instructions can be read into processing device 902 (e.g., into an internal cache or other memory) from main memory 904 and/or data storage system 940. However, it is not required that all of the NLP engine 950 be included in instructions 912 at the same time and portions of the NLP engine 950 are stored in at least one other component of computer system 900 at other times, e.g., when at least one portion of the NLP engine 950 is not being executed by processing device 902.

The computer system 900 further includes a network interface device 908 to communicate over the network 920. Network interface device 908 provides a two-way data communication coupling to a network. For example, network interface device 908 can be an integrated-services digital network (ISDN) card, cable modem, satellite modem, or a modem to provide a data communication connection to a corresponding type of telephone line. As another example, network interface device 908 can be a local area network (LAN) card to provide a data communication connection to a compatible LAN. Wireless links can also be implemented. In any such implementation network interface device 908 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 900.

Computer system 900 can send messages and receive data, including program code, through the network(s) and network interface device 908. In the Internet example, a server can transmit a requested code for an application program through the Internet and network interface device 908. The received code can be executed by processing device 902 as it is received, and/or stored in data storage system 940, or other non-volatile storage for later execution.

The input/output system 910 includes an output device, such as a display, for example a liquid crystal display (LCD) or a touchscreen display, for displaying information to a computer user, or a speaker, a haptic device, or another form of output device. The input/output system 910 can include an input device, for example, alphanumeric keys and other keys configured for communicating information and command selections to processing device 902. An input device can, alternatively or in addition, include a cursor control, such as a mouse, a trackball, or cursor direction keys for communicating direction information and command selections to processing device 902 and for controlling cursor movement on a display. An input device can, alternatively or in addition, include a microphone, a sensor, or an array of sensors, for communicating sensed information to processing device 902. Sensed information can include voice commands, audio signals, geographic location information, haptic information, and/or digital imagery, for example.

The data storage system 940 includes a machine-readable storage medium 942 (also known as a computer-readable medium) on which is stored at least one set of instructions 944 or software embodying any of the methodologies or functions described herein. The instructions 944 can also reside, completely or at least partially, within the main memory 904 and/or within the processing device 902 during execution thereof by the computer system 900, the main memory 904 and the processing device 902 also constituting machine-readable storage media. In one embodiment, the instructions 944 include instructions to implement functionality corresponding to the application software system 730 of FIG. 6 (e.g., NLP engine 150 of FIG. 1, the NLP engine 350 of FIG. 3, or the NLP engine 950 of FIG. 9).

Dashed lines are used in FIG. 9 to indicate that it is not required that the NLP engine 950 be embodied entirely in instructions 912, 914, and 944 at the same time. In one example, portions of the NLP engine 950 are embodied in instructions 914, which are read into main memory 904 as instructions 914, and portions of instructions 912 are read into processing device 902 as instructions 912 for execution. In another example, some portions of the NLP engine 950 are embodied in instructions 944 while other portions are embodied in instructions 914 and still other portions are embodied in instructions 912.

While the machine-readable storage medium 942 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 9 and the accompanying description above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 700, can carry out the above-described computer-implemented methods in response to its processor executing a computer program (e.g., a sequence of instructions) contained in a memory or other non-transitory machine-readable storage medium (e.g., a non-transitory computer readable medium). Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
generating, using a first large language model (LLM) and a first prompt, a training unstructured natural language query using an input training structured search query;
fine-tuning a second LLM using the training unstructured natural language query and the training structured search query, wherein the fine-tuned second LLM generates a structured version of a natural language query;
generating, using the fine-tuned second LLM and a second prompt, a structured natural language query using an input unstructured natural language query;
mapping, using the second LLM, text of the input unstructured natural language query to a tag; and
mapping, using the second LLM, the text of the input unstructured natural language query to a value corresponding to the tag, wherein the structured natural language query comprises the tag and the value.

2. The method of claim 1, wherein the training structured search query is a search query in a predetermined format, the training structured search query being a query for digital content.

3. The method of claim 1, wherein the training unstructured natural language query comprises one or more natural language words associated with a search defined by the training structured search query.

4. The method of claim 1, wherein the first prompt comprises a set of tags, wherein the training structured search query comprises a tag of the set of tags.

5. The method of claim 1, wherein the second prompt comprises a set of tags, wherein the input unstructured natural language query comprises a tag of the set of tags.

6. The method of claim 1, wherein the training unstructured natural language query is associated with a first domain, the method further comprising:
generating, using the first LLM and the first prompt, a second training unstructured natural language query using the input training structured search query, wherein the second training unstructured natural language query is associated with a second domain.

7. The method of claim 1, further comprising:
creating the second prompt comprising the training unstructured natural language query and the training structured search query using retrieval augmented generation.

8. The method of claim 1, further comprising:
creating the first prompt comprising a user-generated structured search query and a user-generated unstructured search query using retrieval augmented generation, wherein the user-generated unstructured search query is a user-generated natural language query.

9. A system comprising:
at least one processor: and
at least one memory device coupled to the at least one processor, wherein the at least one memory device comprises instructions that, when executed by the at least one processor, cause the at least one processor to perform at least one operation comprising:

generating, using a first large language model (LLM) and a first prompt, a training unstructured natural language query using an input training structured search query;

fine-tuning a second LLM using the training unstructured natural language query and the training structured search query, wherein the fine-tuned second LLM generates a structured version of a natural language query;

generating, using the fine-tuned second LLM and a second prompt, a structured natural language query using an input unstructured natural language query;

mapping, using the second LLM, text of the input unstructured natural language query to a tag; and mapping, using the second LLM, the text of the input unstructured natural language query to a value corresponding to the tag, wherein the structured natural language query comprises the tag and the value.

10. The system of claim 9, wherein the training structured search query is a search query in a predetermined format, the training structured search query being a query for digital content.

11. The system of claim 9, wherein the training unstructured natural language query comprises one or more natural language words associated with a search defined by the training structured search query.

12. The system of claim 9, wherein the first prompt comprises a set of tags, wherein the training structured search query comprises a tag of the set of tags.

13. The system of claim 9, wherein the second prompt comprises a set of tags, wherein the input unstructured natural language query comprises a tag of the set of tags.

14. A non-transitory machine-readable storage medium comprising instructions that, when executed by at least one processor, cause the at least one processor to perform at least one operation comprising:

generating, using a first large language model (LLM) and a first prompt, a training unstructured natural language query using an input training structured search query;

fine-tuning a second LLM using the training unstructured natural language query and the training structured search query, wherein the fine-tuned second LLM generates a structured version of a natural language query;

generating, using the fine-tuned second LLM and a second prompt, a structured natural language query using an input unstructured natural language query;

mapping, using the second LLM, text of the input unstructured natural language query to a tag; and mapping, using the second LLM, the text of the input unstructured natural language query to a value corresponding to the tag, wherein the structured natural language query comprises the tag and the value.

15. The non-transitory machine-readable storage medium of claim 14, wherein the training structured search query is a search query in a predetermined format, the training structured search query being a query for digital content.

16. The non-transitory machine-readable storage medium of claim 14, wherein the training unstructured natural language query comprises one or more natural language words associated with a search defined by the training structured search query.

17. The non-transitory machine-readable storage medium of claim 14, wherein the first prompt comprises a set of tags, wherein the training structured search query comprises a tag of the set of tags.

18. The non-transitory machine-readable storage medium of claim 14, wherein the second prompt comprises a set of tags, wherein the input unstructured natural language query comprises a tag of the set of tags.

19. The non-transitory machine-readable storage medium of claim 14, wherein the training unstructured natural language query is associated with a first domain, wherein the instructions, when executed by the at least one processor, cause the at least one processor to perform at least one operation further comprising:

generating, using the first LLM and the first prompt, a second training unstructured natural language query using the input training structured search query, wherein the second training unstructured natural language query is associated with a second domain.

* * * * *